United States Patent
Aldabaibeh et al.

(10) Patent No.: US 9,945,119 B2
(45) Date of Patent: Apr. 17, 2018

(54) METHODS FOR MAKING GYPSUM BOARDS WITH POLYMER COATING AND GYPSUM BOARDS MADE BY THE METHOD

(71) Applicant: United States Gypsum Company, Chicago, IL (US)

(72) Inventors: Naser Aldabaibeh, Homer Glen, IL (US); Suman Sinha Ray, Chicago, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 15/222,538

(22) Filed: Jul. 28, 2016

(65) Prior Publication Data

US 2018/0030729 A1 Feb. 1, 2018

(51) Int. Cl.
*E04C 2/00* (2006.01)
*E04C 2/04* (2006.01)
*B05D 1/02* (2006.01)
*B05D 1/30* (2006.01)

(52) U.S. Cl.
CPC ............... *E04C 2/043* (2013.01); *B05D 1/02* (2013.01); *B05D 1/305* (2013.01)

(58) Field of Classification Search
CPC ...................................................... E04C 2/043
USPC ................................................ 156/40, 43, 44
See application file for complete search history.

(56) References Cited

U.S. PATENT DOCUMENTS

| | | |
|---|---|---|
| 1,953,589 A | 4/1934 | Camp |
| 3,984,596 A | 10/1976 | Failmezger |
| 4,065,587 A | 12/1977 | Ting |
| 4,117,183 A | 9/1978 | Long |
| 4,119,752 A | 10/1978 | Long |
| 4,161,478 A | 7/1979 | Crivello |
| 4,173,476 A | 11/1979 | Smith et al. |
| 4,195,109 A | 3/1980 | Long |
| 4,350,736 A | 9/1982 | Reily |
| 4,555,545 A | 11/1985 | Kimura et al. |
| 4,579,610 A * | 4/1986 | Kole .................. B28B 19/0092 101/211 |
| 4,600,649 A | 7/1986 | Leo |
| 4,859,723 A | 8/1989 | Kyminas et al. |
| 4,900,763 A | 2/1990 | Kraushaar |

(Continued)

FOREIGN PATENT DOCUMENTS

| | | |
|---|---|---|
| EP | 1980540 A1 | 10/2008 |
| EP | 2230075 A1 * | 9/2010 |

(Continued)

OTHER PUBLICATIONS

LEVEL 5 Skim Coated Drywall Rapid Deco® Level 5, Continental Building Products, pp. 7-15, URL: <www.continental-bp.com>, retrieved from the Internet May 9, 2016.

(Continued)

*Primary Examiner* — Jeffry H Aftergut

(74) *Attorney, Agent, or Firm* — Vorys, Sater, Seymour and Pease LLP; Pradip Sahu; Philip T. Petti

(57) ABSTRACT

Methods for making a gypsum board provided with a latex polymer coating layer having a sufficiently low glass transition temperature, a less dense gypsum core layer, and a relatively denser layer of gypsum between the less dense gypsum core layer and the latex polymer coating layer and a gypsum board made by the method.

17 Claims, 9 Drawing Sheets

(56) References Cited

U.S. PATENT DOCUMENTS

| | | |
|---|---|---|
| 4,902,975 A | 2/1990 | Kess |
| 4,959,272 A | 9/1990 | Long |
| 5,126,394 A | 6/1992 | Revis et al. |
| 5,683,635 A | 11/1997 | Sucech et al. |
| 5,718,797 A | 2/1998 | Phillips et al. |
| 5,945,198 A | 8/1999 | Deodhar et al. |
| 6,194,064 B1 | 2/2001 | Keely et al. |
| 6,436,159 B1 | 8/2002 | Safta et al. |
| 6,641,629 B2 | 11/2003 | Safta et al. |
| 6,663,979 B2 | 12/2003 | Deodhar et al. |
| 6,844,374 B2 | 1/2005 | Jin et al. |
| 6,852,768 B2 | 2/2005 | Jin et al. |
| 6,874,930 B2 | 4/2005 | Wittbold et al. |
| 6,887,937 B1 | 5/2005 | Vandevoorde et al. |
| 6,931,809 B1 | 8/2005 | Brown et al. |
| 6,956,079 B2 | 10/2005 | Scarlette |
| 7,214,411 B2 | 5/2007 | Colbert et al. |
| 7,296,919 B2 | 11/2007 | Petersen et al. |
| 7,414,085 B2 | 8/2008 | Colbert et al. |
| 7,469,510 B2 | 12/2008 | Colbert et al. |
| 7,608,347 B2 | 10/2009 | Lettkeman et al. |
| 7,686,902 B2* | 3/2010 | Kimura ............... B28B 19/0092 156/346 |
| 7,998,530 B2 | 8/2011 | Batdorf |
| 8,151,532 B2 | 4/2012 | Zuber et al. |
| 8,404,365 B2* | 3/2013 | Burdick ................ C04B 26/02 156/349 |
| 8,524,373 B2 | 9/2013 | Hedman |
| 2003/0113572 A1 | 6/2003 | Deodhar et al. |
| 2004/0154264 A1 | 8/2004 | Colbert |
| 2004/0170873 A1 | 9/2004 | Smith |
| 2004/0209074 A1 | 10/2004 | Randall et al. |
| 2005/0287293 A1 | 12/2005 | Rothman |
| 2006/0029825 A1 | 2/2006 | Chen et al. |
| 2006/0155031 A1 | 7/2006 | Wiercinski |
| 2006/0278128 A1 | 12/2006 | Liu et al. |
| 2006/0280898 A1 | 12/2006 | Lettkeman et al. |
| 2007/0045892 A1 | 3/2007 | Sucech et al. |
| 2007/0059513 A1* | 3/2007 | Yu ........................ B32B 13/02 428/304.4 |
| 2007/0246178 A1 | 10/2007 | Burdick |
| 2008/0245012 A1 | 10/2008 | Boisvert et al. |
| 2009/0110946 A1 | 4/2009 | Martin et al. |
| 2009/0275250 A1 | 11/2009 | Smith et al. |
| 2009/0297865 A1 | 12/2009 | Hauber et al. |
| 2010/0047461 A1 | 2/2010 | Colbert |
| 2010/0062264 A1 | 3/2010 | Hayes et al. |
| 2010/0186870 A1 | 7/2010 | Stuart et al. |
| 2012/0170403 A1 | 7/2012 | Ll et al. |
| 2012/0214887 A1 | 8/2012 | Stav et al. |
| 2012/0231170 A1 | 9/2012 | Cao et al. |
| 2013/0074737 A1 | 3/2013 | Samanta et al. |
| 2013/0098268 A1 | 4/2013 | Li et al. |
| 2015/0064433 A1 | 3/2015 | Foster et al. |
| 2015/0064488 A1* | 3/2015 | Foster ..................... B32B 9/045 428/514 |

FOREIGN PATENT DOCUMENTS

| | | |
|---|---|---|
| WO | 0212144 A2 | 2/2002 |
| WO | 02058902 A2 | 8/2002 |
| WO | 2004067271 A2 | 8/2004 |
| WO | 2006004615 A1 | 1/2006 |

OTHER PUBLICATIONS

Rapid Deco® Level 5, Drywall, Continental Building Products (2016), URL: <http://www.continental-bp.com/en/products-and-solutions/drywall/rapid-deco-level-5>, retrieved from the Internet May 9, 2016.

* cited by examiner

METHODS FOR MAKING GYPSUM BOARDS WITH POLYMER COATING AND GYPSUM BOARDS MADE BY THE METHOD

FIELD OF THE INVENTION

This invention relates to a method and composition for preparing set gypsum-containing products, e.g., gypsum boards, and methods for producing them. More particularly, the invention concerns such set gypsum-containing products having a polymer coating penetrating the face sheet.

BACKGROUND

In many types of cementitious articles, set gypsum (calcium sulfate dihydrate) is often a major constituent. For example, set gypsum is a major component of end products created by use of traditional plasters (e.g., plaster-surfaced internal building walls), and also in faced gypsum board employed in typical drywall construction of interior walls and ceilings of buildings. In addition, set gypsum is the major component of gypsum/cellulose fiber composite boards and products, as described in U.S. Pat. No. 5,320,677. Set gypsum is also included in products that fill and smooth the joints between edges of gypsum board (see, e.g., U.S. Pat. No. 3,297,601). Also, many specialty materials, such as materials useful for modeling and mold-making that are precisely machined, produce products that contain major amounts of set gypsum. Typically, such gypsum-containing cementitious products are made by preparing a mixture of calcined gypsum (calcium sulfate alpha or beta hemihydrate and/or calcium sulfate anhydrite), water, and other components, as appropriate to form a cementitious slurry. In the manufacture of cementitious articles, the cementitious slurry and desired additives are often blended in a continuous mixer, as for example described in U.S. Pat. No. 3,359,146.

For example, in a typical gypsum panel manufacturing process, gypsum board is produced by uniformly dispersing calcined gypsum (commonly referred to as "stucco") in water to form an aqueous calcined gypsum slurry. The aqueous calcined gypsum slurry is typically produced in a continuous manner by inserting stucco and water and other additives into a mixer which contains means for agitating the contents to form a uniform gypsum slurry. The slurry is continuously directed toward and through a discharge outlet of the mixer and into a discharge conduit connected to the discharge outlet of the mixer. An aqueous foam can be combined with the aqueous calcined gypsum slurry in the mixer and/or in the discharge conduit. The stream of slurry passes through the discharge conduit from which it is continuously deposited onto a moving web of cover sheet material supported by a forming table.

The slurry is allowed to spread over the advancing web. A second web of cover sheet material is applied to cover the slurry and form a sandwich structure of a continuous wallboard preform, which is subjected to forming, such as at a conventional forming station, to obtain a desired thickness.

The calcined gypsum reacts with the water in the wallboard preform and sets as a conveyor moves the wallboard preform down a manufacturing line. The wallboard preform is cut into segments at a point along the line where the preform has set sufficiently. The segments are flipped over, dried (e.g., in a kiln) to drive off excess water, and processed to provide the final wallboard product of desired dimensions.

Prior devices and methods for addressing the production of gypsum wallboard are disclosed in commonly-assigned U.S. Pat. Nos. 5,683,635; 5,643,510; 6,494,609; 6,874,930; 7,007,914; and 7,296,919, which are incorporated by reference.

According to WO 02/12144, it is known to apply a skim coating comprising water, mineral filler, and binder to one side of the board. WO 02/058902 teaches applying a coating to a wet gypsum board prior to drying the gypsum board. In addition U.S. Pat. No. 6,663,979 teaches applying to a gypsum board either before or after drying of the board a coating including a binder, a soy protein, and two or more pigments. U.S. Pat. No. 7,214,411 teaches a manufacturing line for gypsum boards including a conveyor for moving gypsum boards in a line, a spray arm having a pivot at one end thereof for supporting the spray arm in a pivotable manner.

Nail pull is an important parameter for gypsum boards. However, increasing nail pull of gypsum boards remains a challenge.

There is a continuing need for new and improved set gypsum-containing products, and compositions and methods for producing them that solve, avoid, or minimize the problems noted above.

SUMMARY OF THE INVENTION

The invention provides a method of making a gypsum board, comprising:

providing a face paper sheet having an inner bond surface and an outer surface, the face paper sheet inner bond surface opposed to the face paper sheet outer surface;

applying a polymer coating to the inner bond surface of the face paper sheet, wherein the polymer coating comprises water and latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof and surfactant, the latex polymer having a glass transition temperature (Tg) of −10° C. to about 30° C.;

depositing a first layer of relatively dense gypsum slurry comprising water and calcium sulfate hemihydrate directly on the polymer coated inner bond surface of the face paper sheet to form a first layer of relatively dense slurry, wherein all of the surface of the face paper sheet which contacts the relatively dense gypsum slurry is coated with the polymer;

mixing water, calcium sulfate hemihydrate and air to make a foamed gypsum slurry, wherein a weight ratio of the water to calcium sulfate hemihydrate being mixed is 0.2-1.5:1, preferably 0.2-0.8:1, more preferably 0.4-0.7:1;

depositing the foamed gypsum slurry directly on the first layer of relatively dense gypsum slurry to form a foamed gypsum core layer to locate the first layer of relatively dense gypsum layer between the gypsum core layer and the face paper sheet inner bond surface;

wherein calcium sulfate hemihydrate in the foamed gypsum slurry and calcium sulfate hemihydrate in the relatively dense gypsum slurry convert to calcium sulfate dihydrate, and the foamed gypsum slurry and the relatively dense gypsum slurry set to form the gypsum board, wherein a foamed gypsum core layer resulting from the set foamed gypsum slurry has a thickness of 0.25 to 1 inches and a density of 15 to 55 pounds/cubic foot, wherein the foamed gypsum core layer has a total void volume of 30 to 90 volume percent;

the relatively dense gypsum slurry having a density greater than that of the foamed gypsum slurry, the first layer of relatively dense gypsum slurry being thinner than the foamed gypsum core layer, wherein the set first layer of relatively dense gypsum resulting from setting the relatively dense gypsum slurry has a total void volume of less than 30 volume percent;

wherein the polymer coating is at least partially not set at the time the first layer of relatively dense slurry is applied to the polymer coating;

wherein the polymer coating adheres the face paper sheet to the set first layer of relatively dense gypsum;

wherein at least a portion of the polymer coating penetrates from the inner bond surface of the face paper sheet through a portion of the face paper sheet but not uniformly into the first layer of relatively dense slurry, wherein at least 90% of the thickness of the set first relatively dense gypsum layer has an absence of the polymer of the polymer coating;

wherein the polymer coating applied has an absence of gypsum, wherein the polymer coating applied has an absence of calcium carbonate, wherein the polymer coating applied has an absence of magnesium carbonate, wherein the polymer coating applied has an absence of pigment, wherein the polymer coating applied has an absence of polyurea, wherein the polymer coating applied has an absence of inorganic particles.

For purposes of the present specification the polymer being partially not set means the polymer is still soft but not flowing. Thus, the polymer is still tacky to be adhesive and enhance the interfacial bond of the paper to the relatively denser gypsum layer.

The nail hold of the board is greater than 80 pounds.

The invention provides a gypsum board, comprising:

a face paper sheet having an inner bond surface and an outer surface, the face paper sheet inner bond surface opposed to the face paper sheet outer surface;

the face paper sheet treated with a polymer coating disposed on the entire inner bond surface of the face paper sheet, wherein the polymer coating comprises water and latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, and surfactant, the latex polymer having a glass transition temperature (Tg) of −10° C. to about 30° C.;

a first relatively dense gypsum layer comprising calcium sulfate dihydrate directly on the inner bond surface treated with the polymer coating;

a foamed gypsum core layer directly on the first relatively dense gypsum layer, the foamed gypsum core layer comprising calcium sulfate dihydrate having opposed first and second sides, wherein the first relatively dense gypsum layer is between the first bond side of the foamed gypsum core layer and the face paper sheet inner bond surface;

wherein the gypsum core layer has a thickness of 0.25 to 1 inches and a density of 15 to 55 pounds/cubic foot, wherein the foamed gypsum core layer has a total void volume of 30 to 90 volume percent;

the first relatively dense gypsum layer having a density greater than density of the foamed gypsum core layer, the first layer of relatively dense gypsum being thinner than the foamed gypsum core layer, wherein the first layer of relatively dense gypsum has a total void volume of less than 30 volume percent;

the face paper sheet adhered by the polymer coating to the first relatively dense gypsum layer, wherein at least a portion of the polymer coating penetrates from the inner bond surface of the face paper sheet through a portion of the face paper sheet but not uniformly into the first relatively dense gypsum layer, wherein at least 90% of the thickness of the first relatively dense gypsum layer has an absence of the polymer of the polymer coating;

wherein the polymer coating has an absence of gypsum, wherein the polymer coating has an absence of calcium carbonate, wherein the polymer coating has an absence of magnesium carbonate, wherein the polymer coating has an absence of pigment, wherein the polymer coating has an absence of polyurea, wherein the polymer coating has an absence of inorganic particles.

All percentages and ratios are by weight unless otherwise indicated. All molecular weights are weight average molecular weights unless otherwise indicated.

DESCRIPTION OF PREFERRED EMBODIMENTS

Figure 1:
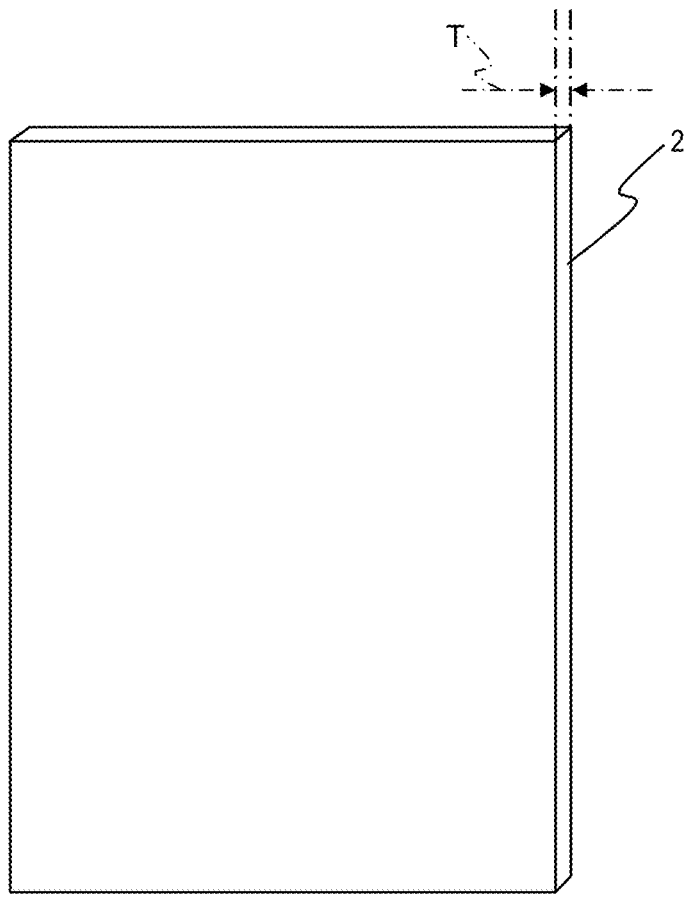
FIG. 1 shows a board of the present invention.

The cementitious material includes any calcium sulfate hemihydrate, also known as stucco or calcined gypsum. The cementitious material is at least 60 wt % calcium sulfate hemihydrate. Preferably, the amount of calcium sulfate hemihydrate is at least 75 wt %, at least 80 wt % or at least 85 wt %. In many wallboard formulations, the hydraulic material is substantially all calcium sulfate hemihydrate. Any form of calcined gypsum may be used, including but not limited to alpha or beta stucco. Thus, the cementitious material comprises calcined gypsum, such as in the form of calcium sulfate alpha hemihydrate, calcium sulfate beta hemihydrate, and/or calcium sulfate anhydrite. In embodiments, the calcined gypsum can be fibrous in some embodiments and non-fibrous in others. The calcined gypsum can include at least about 50% beta calcium sulfate hemihydrate.

In other embodiments, the calcined gypsum can include at least about 86% beta calcium sulfate hemihydrate. Use of calcium sulfate anhydrite, synthetic gypsum or landplaster is also contemplated, although preferably in small amounts of less than 20%. Other hydraulic materials, including cement and fly ash, are optionally included in the slurry.

The weight ratio of water to calcined gypsum can be any suitable ratio, although, as one of ordinary skill in the art will appreciate, lower ratios can be more efficient because less excess water must be driven off during manufacture, thereby conserving energy. In some embodiments, the cementitious slurry can be prepared by combining water and calcined gypsum (calcium sulfate hemihydrate) in a range from about a 1:6 ratio by weight respectively to about 1:1 ratio, preferably 0.2-0.8:1, more preferably 0.4-0.8:1, such as about 2:3, for board production depending on products.

The dispersant is present in said slurry in amounts from about 0.01% to about 2% by weight of the dry dispersant calculated as a percentage of the dry gypsum. Preferably, linear polycarboxylate anionic dispersant is present in amounts from about 0.05% to about 0.5% by weight of the dry dispersant calculated as a percentage of the dry gypsum.

Preferably, the gypsum slurry for the core of a gypsum board (also known as a gypsum panel) of the invention is foamed to have 10 to 70 volume percent air, preferably 20 to 60 volume percent air. The resulting board has 30 to 92 volume % voids, preferably 30 to 90 volume %.

Gypsum Board and Method of Making

Preferably the method and composition of the invention are for preparing gypsum board 2 (see FIG. 1) comprising a core of set gypsum-containing material sandwiched between cover sheets.

Figure 2:
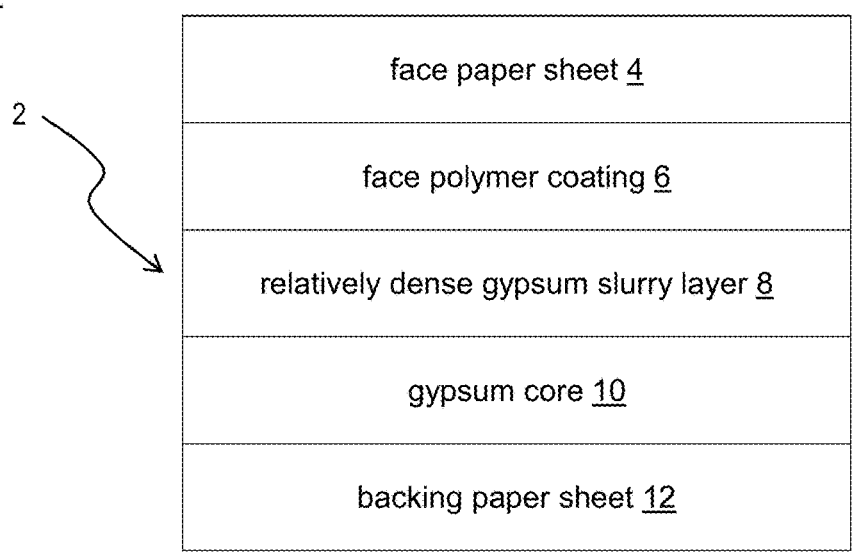
FIG. 2 schematically shows a first arrangement for a board cross section.

FIG. 2 shows a first arrangement of the layers for the gypsum board 2. It has a face paper sheet 4, a face polymer coating 6, a relatively dense gypsum layer 8, a gypsum core 10, and preferably a backing paper sheet 12.

Figure 3:
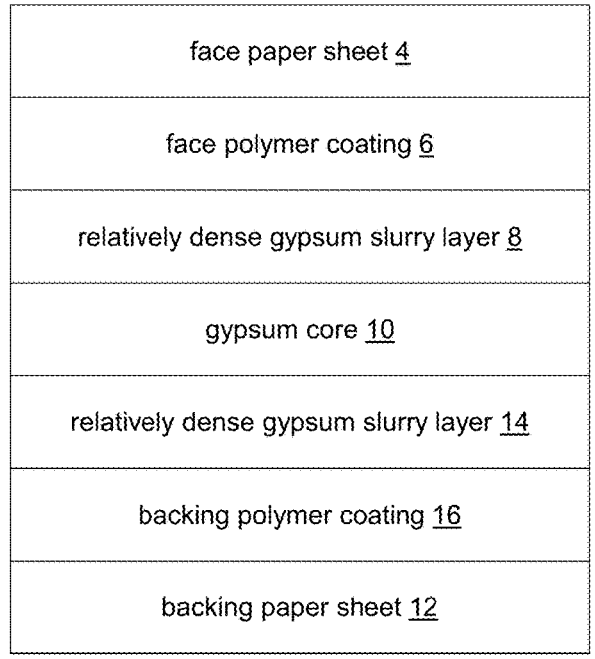
FIG. 3 schematically shows a second arrangement for a board cross section

FIG. 3 shows a second arrangement of the layers for the gypsum board 2. It has the face paper sheet 4, the face polymer coating 6, the first relatively dense gypsum layer 8, the gypsum core 10, a second relatively dense gypsum layer 14, a backing polymer coating 16, and the backing paper sheet 12.

The gypsum board of the invention, comprises:

a face paper sheet having an inner bond surface and an outer surface, the face paper sheet inner bond surface opposed to the face paper sheet outer surface;

the face paper sheet treated with a polymer coating disposed on the entire inner bond surface of the face paper sheet, wherein the polymer coating comprises water and latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, and surfactant, the latex polymer having a glass transition temperature (Tg) of −10° C. to about 30° C.;

a first relatively dense gypsum layer comprising calcium sulfate dihydrate directly on the inner bond surface treated with the polymer coating;

a foamed gypsum core layer directly on the first relatively dense gypsum layer, the foamed gypsum core layer comprising calcium sulfate dihydrate having opposed first and second sides, wherein the first relatively dense gypsum layer is between the first bond side of the foamed gypsum core layer and the face paper sheet inner bond surface;

wherein the gypsum core layer has a thickness of 0.25 to 1 inches and a density of 15 to 55 pounds/cubic foot, wherein the foamed gypsum core layer has a total void volume of 30 to 90 volume percent;

the first relatively dense gypsum layer having a density greater than density of the foamed gypsum core layer, the first layer of relatively dense gypsum being thinner than the foamed gypsum core layer, wherein the first layer of relatively dense gypsum has a total void volume of less than 30 volume percent;

the face paper sheet adhered by the polymer coating to the first relatively dense gypsum layer, wherein at least a portion of the polymer coating penetrates from the inner bond surface of the face paper sheet through a portion of the face paper sheet but not uniformly into the first relatively dense gypsum layer, wherein at least 90% of the thickness of the first relatively dense gypsum layer has an absence of the polymer of the polymer coating;

wherein the polymer coating has an absence of gypsum, wherein the polymer coating has an absence of calcium carbonate, wherein the polymer coating has an absence of magnesium carbonate, wherein the polymer coating has an absence of pigment, wherein the polymer coating has an absence of polyurea, wherein the polymer coating has an absence of inorganic particles.

The method of making the gypsum board of the invention, comprises:

providing a face paper sheet having an inner bond surface and an outer surface, the face paper sheet inner bond surface opposed to the face paper sheet outer surface;

applying a polymer coating to the inner bond surface of the face paper sheet, wherein the polymer coating comprises water and latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof and surfactant, the latex polymer having a glass transition temperature (Tg) of −10° C. to about 30° C.;

depositing a first layer of relatively dense gypsum slurry comprising water and calcium sulfate hemihydrate directly on the polymer coated inner bond surface of the face paper sheet to form a first layer of relatively dense slurry, wherein all of the surface of the face paper sheet which contacts the relatively dense gypsum slurry is coated with the polymer;

mixing water, calcium sulfate hemihydrate and air to make a foamed gypsum slurry, wherein a weight ratio of the water to calcium sulfate hemihydrate being mixed is 0.2-1.5:1, preferably 0.2-0.8:1, more preferably 0.4-0.7:1;

depositing the foamed gypsum slurry directly on the first layer of relatively dense gypsum slurry to form a foamed gypsum core layer to locate the first layer of relatively dense gypsum layer between the gypsum core layer and the face paper sheet inner bond surface;

wherein calcium sulfate hemihydrate in the foamed gypsum slurry and calcium sulfate hemihydrate in the relatively dense gypsum slurry convert to calcium sulfate dihydrate, and the foamed gypsum slurry and the relatively dense gypsum slurry set to form the gypsum board, wherein a foamed gypsum core layer resulting from the set foamed gypsum slurry has a thickness of 0.25 to 1 inches and a density of 15 to 55 pounds/cubic foot, wherein the foamed gypsum core layer has a total void volume of 30 to 90 volume percent;

the relatively dense gypsum slurry having a density greater than that of the foamed gypsum slurry, the first layer of relatively dense gypsum slurry being thinner than the foamed gypsum core layer, wherein the set first layer of relatively dense gypsum resulting from setting the relatively dense gypsum slurry has a total void volume of less than 30 volume percent;

wherein the polymer coating is at least partially not set at the time the first layer of relatively dense slurry is applied to the polymer coating;

wherein the polymer coating adheres the face paper sheet to the set first layer of relatively dense gypsum;

wherein at least a portion of the polymer coating penetrates from the inner bond surface of the face paper sheet through a portion of the face paper sheet but not uniformly into the first layer of relatively dense slurry, wherein at least 90% of the thickness of the set first relatively dense gypsum layer has an absence of the polymer of the polymer coating;

wherein the polymer coating has an absence of gypsum, wherein the polymer coating has an absence of calcium carbonate, wherein the polymer coating has an absence of magnesium carbonate, wherein the polymer coating has an absence of pigment, wherein the polymer coating has an absence of polyurea, wherein the polymer coating has an absence of inorganic particles.

Figure 4:
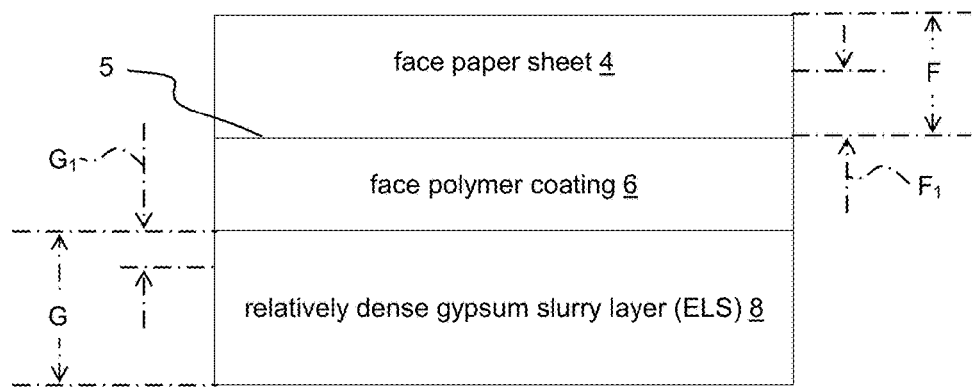
FIG. 4 shows a schematic of a portion of the layers of the board cross section of FIG. 2.

The polymer of the polymer coating can migrate from the inner bond surface 5 through all or a portion of thickness "F" of the face paper sheet 4. FIG. 4 shows a portion of the board of FIG. 2 and labels thickness "F" of the face paper and thickness "$F_1$" which is a portion of the face paper thickness "F" into which the face polymer coating 6 migrates into the face paper. Preferably the polymer of the face polymer coating 6 migrates through at least 20% of the thickness "F" of the face paper sheet 4. Also, FIG. 4 labels thickness "G" of the first relatively dense gypsum layer 8, and thickness "$G_1$" which is the at most 10%, preferably at most 5% limit of the first relatively dense gypsum layer 8 into which the polymer of the polymer coating can migrate into the first relatively dense gypsum layer 8. Most preferably the polymer of the face polymer coating 16 does not migrate into the first relatively dense gypsum layer 8. These parameters of the first relatively dense gypsum layer 8 and the face polymer coating are the same for the second relatively dense gypsum layer 14 and the backing polymer coating 16 of FIG. 3.

The face paper sheet and backing paper sheet are respectively provided as a roll of sheet material without polymer coating and the polymer coating is applied to the face paper sheet on a production line for the board. The polymer coating is applied to the inner bond side of the face paper sheet and optionally also to the outer side of the face paper sheet. The polymer coating is typically applied by a curtain coater, sprayers, such as nozzles or shower sprayers, drip lines, and atomization techniques. Preferably the polymer coating is applied only to the inner side of the face paper sheet. More preferably the polymer coating is applied by spraying the inner side of the face paper sheet.

The slurry from which the gypsum core material was made was a mixture of water and calcium sulfate hemihydrate at a water to calcium sulfate hemihydrate weight ratio of 0.2-1.5:1, preferably 0.2-0.8:1, more preferably 0.4-0.7:1. The board comprises the gypsum core sandwiched between the face paper sheet and a back paper sheet.

The core slurry preferably sets at least 50% in 10 minutes. Thus, the board is at least 50% set in 10 minutes.

The foam slurry of the invention for the gypsum core further comprises aqueous foam of air bubbles. Such composition and method provide a board of lighter weight, because the bubbles of aqueous foam result in corresponding air voids in the set gypsum core of the resultant board.

The foamed gypsum slurry has 15 to 70 volume percent air bubbles, more preferably 20 to 70 volume percent air, most preferably 20 to 60 volume percent air. The volume percent of total void volume of the gypsum board may be higher than the volume percent of bubbles of the foamed gypsum slurry from which the gypsum board is made. This is because additional voids (water voids) result from spaces between particles when water is removed as the slurry sets to form the board. Thus, the gypsum board may have a total void volume of 30 to 90 volume percent, more preferably 35 to 85 volume percent, most preferably 45 to 80 volume percent. If air is added in the method of the invention the calcium sulfate hemihydrate and water are mixed to form the slurry and then the air is added by entraining air into the slurry and/or by adding foam water to the slurry.

The relatively dense gypsum slurry has less than 30 volume % air, preferably less than 10 volume % air. The relatively dense gypsum layer resulting from the setting of the relatively dense gypsum slurry has total void volume less than 30 volume %, preferably less than 10 volume %.

The slurry comprises dispersant and a hydraulic component comprising at least 50% calcium sulfate hemihydrate by weight, preferably at least 80% calcium sulfate hemihydrate by weight, based on the dry weight of the hydraulic component and the slurry is made into a gypsum core material of a gypsum board (also known as a gypsum panel). The gypsum slurry from which the gypsum board was made has a water to calcium sulfate hemihydrate weight ratio of 0.1-1.5:1, preferably 0.2-0.8:1, more preferably 0.4-0.8:1.

The slurry is made from gypsum (calcium sulfate hemihydrate), water and the dispersant. In operation, to make the slurry for the board the gypsum is moved on a conveyor toward a slurry mixer. Prior to entry into the mixer, dry additives, such as dry set accelerators, are added to the powdered gypsum. Water is also added. Air is also added. Some additives are added directly to the mixer via a separate line. Other additives may also be added to the water. This is particularly convenient where the additives are in liquid form. For most additives, there is no criticality regarding placing the additives in the slurry, and they may be added using whatever equipment or method is convenient.

However, the dispersant is preferably added to the water prior to addition of the stucco (as used in this specification stucco is the calcium sulfate hemihydrate). Gauge water or make-up water is added at the slurry mixer in amounts needed to meet the target water to stucco ratio when water from other sources has been considered. After contact with water the gypsum (calcium sulfate hemihydrate) converts to calcium sulfate dihydrate during production of the board.

The slurry from the slurry mixer for the gypsum core slurry then passes from the slurry mixer to a slurry distributor which deposits the slurry for the gypsum core slurry on the cover sheet on a forming table. If the cover sheet on the forming table is the face paper sheet then it has the polymer coating over the face paper sheet and the relatively denser gypsum layer over the polymer coating so the gypsum core slurry is deposited on the relatively denser gypsum layer. Then after the gypsum core slurry is deposited a backing sheet is applied. If desired a second relatively denser gypsum slurry layer is applied to directly contact the gypsum core slurry.

If desired the paper backing sheet, which optionally also has a polymer layer of the same polymer as on the face paper sheet, is applied to the second relatively denser gypsum slurry layer.

The face paper sheets and optionally the backing paper sheets are coated during board manufacture. When applied during board manufacture the polymer of the polymer coating will be disposed on the entire inner and/or outer surface of the face paper sheet.

Processes and Apparatus for Board Manufacture

The present method applies at least one polymer layer to a face paper sheet of cover sheet material, a layer of relatively dense gypsum to the web having the polymer material, and a layer of the foamed gypsum slurry to the layer of relatively dense gypsum. Then additional layers and a back paper sheet may be applied over the layer of the foamed gypsum slurry.

Figure 5:
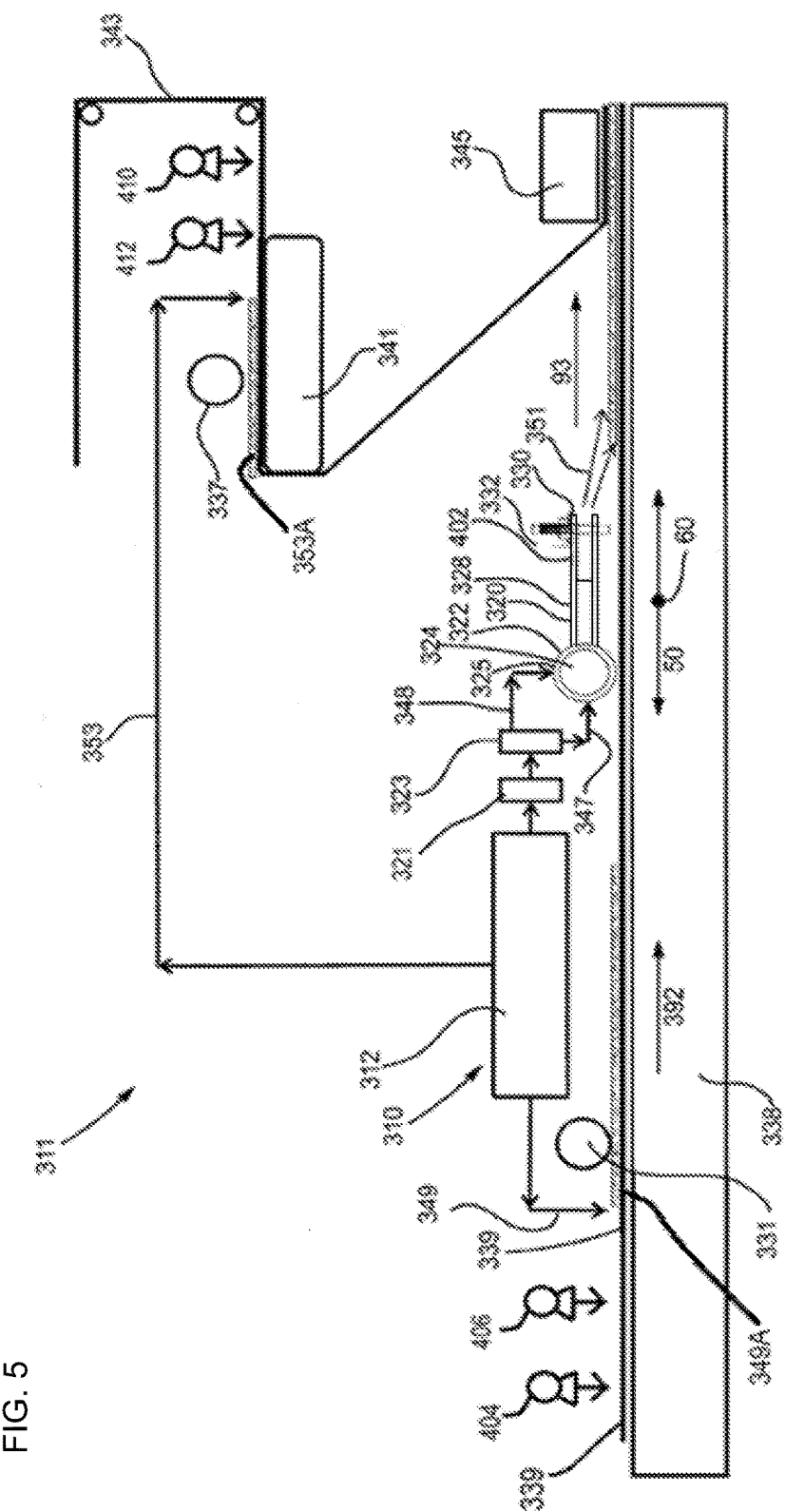
FIG. 5 shows a first embodiment of an apparatus for making a board of the present invention.

An apparatus for performing the method of making a gypsum board of the present invention which includes applying the polymer layer is shown in FIG. 5.

FIG. 5 shows an exemplary embodiment of a wet end 311 of a gypsum wallboard manufacturing line. The wet end 311 includes a gypsum slurry mixing and dispensing assembly 310 including a slurry distributor 320 (such as slurry distributor 20 of FIG. 7), a hard edge/face skim coat roller 331 disposed upstream of the slurry distributor 320 and supported over a forming table 338 such that a first moving web 339 of cover sheet material is disposed therebetween, a back skim coat roller 337 disposed over a support element 341 such that a second moving web 343 of cover sheet material is disposed therebetween, and a forming station 345 adapted to shape the preform into a desired thickness. The skim coat rollers 331, 337, the forming table 338, the support element 341, and the forming station 345 can all comprise conventional equipment suitable for their intended purposes as is known in the art. The wet end 311 can be equipped with other conventional equipment as is known in the art.

Water and calcined gypsum can be mixed in the mixer 312 to form the first and second flows 347, 348 of aqueous calcined gypsum slurry. Generally, the water and calcined gypsum can be continuously added to the mixer in a water-to-calcined gypsum ratio from about 0.5 to about 1.3, and in other embodiments of about 0.75 or less.

The slurry distributor 320 distributes the aqueous calcined gypsum slurry upon the first advancing web 339.

Gypsum board products are typically formed "face down" such that the advancing web 339 serves as the "face" cover sheet of the finished board. A face skim coat/hard edge stream 349 (a layer of denser aqueous calcined gypsum slurry relative to at least one of the first and second flows of aqueous calcined gypsum slurry) can be applied to the first moving web 339 as layer 349A upstream of the hard edge/face skim coat roller 331, relative to the machine direction 392, to apply a skim coat layer to the first web 339 and to define hard edges of the board.

Foam conduit 321 is employed as explained for foam conduit 121 of FIG. 5 such that foamed slurry is fed to the slurry distributor 20.

The first flow 347 and the second flow 348 of aqueous calcined gypsum slurry are respectively passed through the first feed inlet 324 and the second feed inlet 325 of the slurry distributor 320. The first feed inlet 324 and the second feed inlet 325 are respectively disposed on opposing sides of the slurry distributor 320. The first and second flows 347, 348 of aqueous calcined gypsum slurry are combined in the slurry distributor 320. The first and second flows 347, 348 of aqueous calcined gypsum slurry move along a flow path through the slurry distributor 320 in the manner of a streamline flow, undergoing minimal or substantially no air-liquid slurry phase separation and substantially without undergoing a vortex flow path.

The first moving web 339 moves along the longitudinal axis 50. The first flow 347 of aqueous calcined gypsum slurry passes through the first feed inlet 324 moving in the first feed direction 90, and the second flow 348 of aqueous calcined gypsum slurry passes through the second feed inlet 325 moving in the second feed direction 91, which is in opposing relationship to the first feed direction 90. The first and the second feed direction 90, 91 are substantially parallel to the transverse axis 60, which is substantially perpendicular to the longitudinal axis 50.

The distribution conduit 328 is positioned such that it extends along the longitudinal axis 50 which substantially coincides with the machine direction 392 along which the first web 339 of cover sheet material moves. Preferably, the central midpoint of the distribution outlet 330 (taken along the transverse axis/cross-machine direction) substantially coincides with the central midpoint of the first moving cover sheet 339. The first and second flows 347, 348 of aqueous calcined gypsum slurry combine in the slurry distributor 320 such that the combined first and second flows 351 of aqueous calcined gypsum slurry pass through the distribution outlet 330 in a distribution direction 93 generally along the longitudinal axis 50.

In some embodiments, the distribution conduit 328 is positioned such that it is substantially parallel to the plane defines by the longitudinal axis 50 and the transverse axis 60 of the first web 339 moving along the forming table. In other embodiments, the entry portion of the distribution conduit can be disposed vertically lower or higher than the distribution outlet 330 relative to the first web 339.

The combined first and second flows 351 of aqueous calcined gypsum slurry are discharged from the slurry distributor 320 upon the first moving web 339. The face skim coat/hard edge stream 349 can be deposited from the mixer 312 at a point upstream, relative to the direction of movement of the first moving web 339 in the machine direction 392, of where the first and second flows 347, 348 of aqueous calcined gypsum slurry are discharged from the slurry distributor 320 upon the first moving web 339. The combined first and second flows 347, 348 of aqueous calcined gypsum slurry can be discharged from the slurry distributor with a reduced momentum per unit width along the cross-machine direction relative to a conventional boot design to help prevent "washout" of the face skim coat/hard edge stream 349 deposited on the first moving web 339 (i.e., the situation where a portion of the deposited skim coat layer is displaced from its position upon the moving web 339 in response to the impact of the slurry being deposited upon it).

The first and second flows 347, 348 of aqueous calcined gypsum slurry respectively passed through the first and second feed inlets 324, 325 of the slurry distributor 320 can be selectively controlled with at least one flow-modifying element 323. For example, in some embodiments, the first and second flows 347, 348 of aqueous calcined gypsum slurry are selectively controlled such that the average velocity of the first flow 347 of aqueous calcined gypsum slurry passing through the first feed inlet 324 and the average velocity of the second flow 348 of aqueous calcined gypsum slurry passing through the second feed inlet 325 are varied.

In other embodiments, the average velocity of the first and second flows 347 348 of aqueous calcined gypsum slurry are varied in an alternating, oscillating manner between relatively higher and lower velocities. In this way, at a point in time the average velocity of the first flow 347 of aqueous calcined gypsum slurry passing through the first feed inlet 324 is higher than the average velocity of the second flow 348 of aqueous calcined gypsum slurry passing through the second feed inlet 325, and at another point in time the average velocity of the first flow 347 of aqueous calcined gypsum slurry passing through the first feed inlet 324 is lower than the average velocity of the second flow 348 of aqueous calcined gypsum slurry passing through the second feed inlet 325.

The combined first and second flows 351 of aqueous calcined gypsum slurry are discharged from the slurry distributor 320 through a distribution outlet 330. The distribution outlet 330 has a width extending along the transverse axis 60 and sized such that the ratio of the width of the first moving web 339 of cover sheet material to the width of the distribution outlet 330 is within a range including and between about 1:1 and about 6:1. The ratio of the average velocity of the combined first and second flows 351 of aqueous calcined gypsum slurry discharging from the slurry distributor 320 to the velocity of the moving web 339 of cover sheet material moving along the machine direction 392 can be about 2:1 or less in some embodiments, and from about 1:1 to about 2:1 in other embodiments.

The combined first and second flows 351 of aqueous calcined gypsum slurry discharging from the slurry distributor 320 form a spread pattern upon the moving web 339. At least one of the size and shape of the distribution outlet 330 can be adjusted, which in turn can change the spread pattern.

Thus, slurry is fed into both feed inlets 324, 325 of the feed conduit 322 and then exits through the distribution outlet 330 with an adjustable gap. The converging portion 402 can provide a slight increase in the slurry velocity so as to reduce unwanted exit effects and thereby further improve flow stability at the free surface. Side-to-side flow variation and/or any local variations can be reduced by performing cross-machine (CD) profiling control at the discharge outlet 330 using the profiling system 332. This distribution system can help prevent air-liquid slurry separation in the slurry resulting in a more uniform and consistent material delivered to the forming table 338. In some embodiments, the slurry velocities at the feed inlets 324, 325 of the feed conduit 322 can oscillate periodically between relatively higher and lower average velocities (at one point in time one inlet has a higher velocity than the other inlet, and then at a predetermined point in time vice versa) to help reduce the chance of buildup within the geometry itself.

A back skim coat stream 353 (a layer of denser aqueous calcined gypsum slurry relative to at least one of the first and second flows 347, 348 of aqueous calcined gypsum slurry) can be applied to the second moving web 343 as layer 353A. The back skim coat stream 353 can be deposited from the mixer 312 at a point upstream, relative to the direction of movement of the second moving web 343, of the back skim coat roller 337.

FIG. 5 also shows how to coat the polymer onto the first moving web 339 for face paper sheets and the second moving web 343 for backing paper sheets. In particular the production line of FIG. 5 provides a spray nozzle 404 for spraying polymer coating onto the first moving web 339. If desired the production line is also provided with a dryer 406 to dry the polymer coating. The production line of FIG. 5 also provides a spray nozzle 410 for spraying polymer coating onto the first moving web 339. If desired the production line is also provided with a dryer 412 to dry the polymer coating. The coating can be applied using traditional coating machinery, such as a sprayer such as nozzle or shower sprayers (as shown in FIG. 5), a curtain coater, drip lines, and atomization devices. An example of spray technology uses spray tips suspended over the wallboard line. Another alternative method is a blade technology that scrapes the coating onto the surface of the moving paper web for the face sheet or the backing sheet.

The polymer coating is applied as an aqueous latex dispersion. The coating is applied to have time to penetrate into the wet facing sheet and the wet backing sheet during conveying. In other words the paper absorbs all or part of the coating. In this way the coating strengthens the paper of the facing sheet and the wet backing sheet. This gives the board its improved nail pull property.

The driers 406, 412 can be any suitable driers. For example air driers or heat lamps producing infrared light.

In the apparatus of FIG. 5, the sprayer 404 and dryer 406 are oriented to coat the polymer coating on the side of the face paper facing the gypsum core slurry. If it is desired to have the polymer coating on the outside of the board, then the sprayer 404 and dryer 406 would be reverse oriented as shown in FIG. 5 to have the polymer coating on the side of the face paper facing away from the gypsum core slurry.

In the apparatus of FIG. 5, the sprayer 410 and dryer 412 are oriented to have the polymer coating on the side of the backing paper facing the gypsum core slurry. If it is desired to have the polymer coating on the outside of the board, then the sprayer 410 and dryer 412 would be reverse oriented as shown in FIG. 5 to have the polymer coating on the side of the backing paper facing away from the gypsum core slurry.

Figure 6:
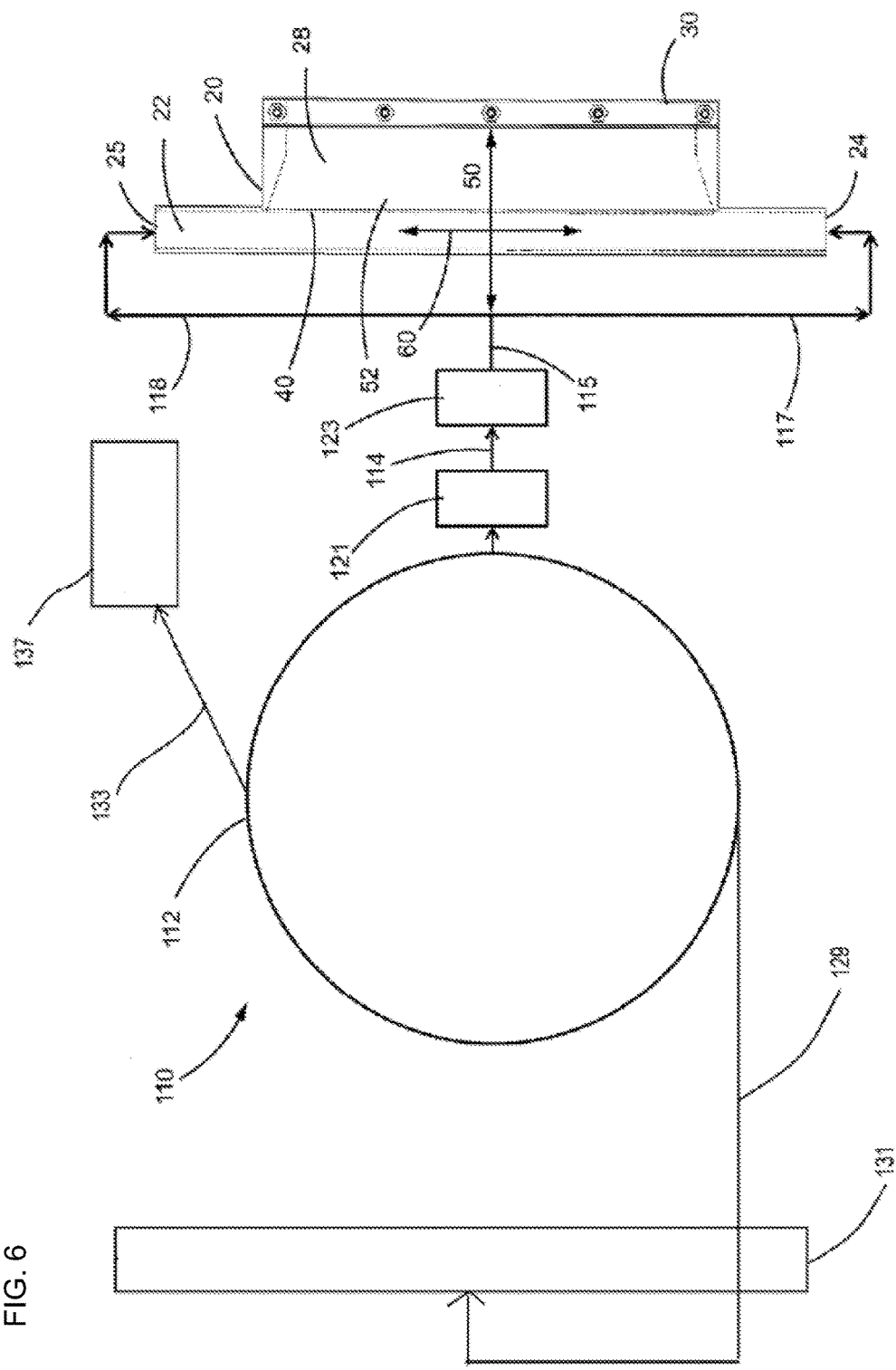
FIG. 6 shows a slurry mixer that may be employed with the present invention.
Figure 7:
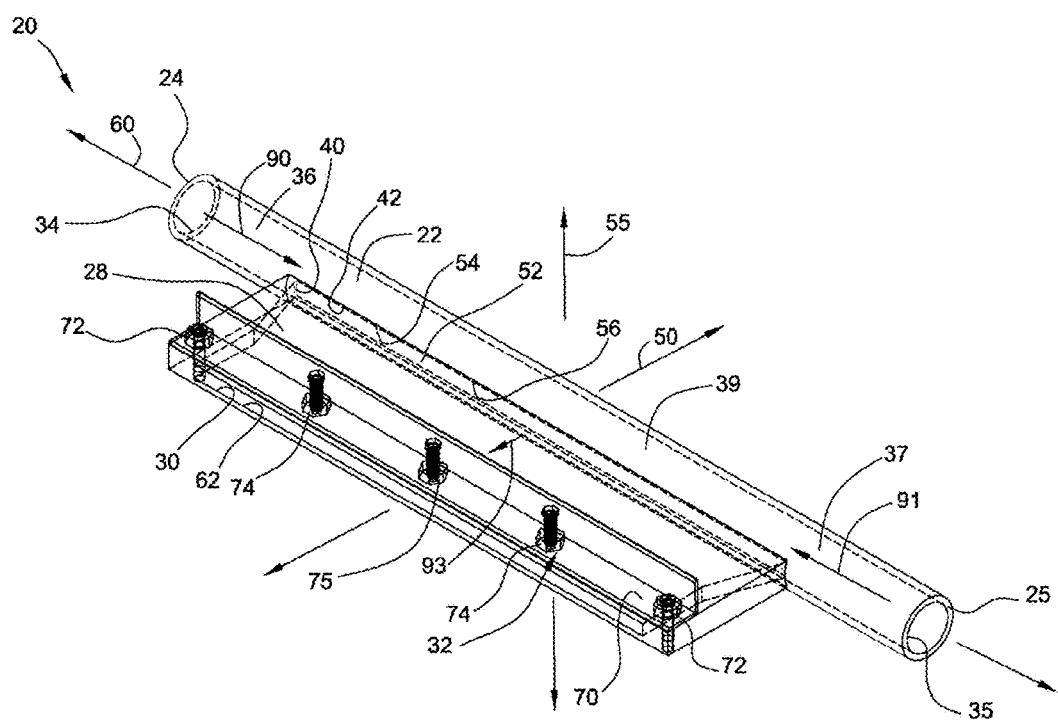
FIG. 7 shows a slurry distributor that may be employed with the present invention.

FIGS. 6 and 7 show details of an example of an apparatus to apply the layers 8, 14 of relatively dense gypsum to the webs of cover sheet material for face paper sheet 4 and backing paper sheet 12. The webs are treated with a very thin relatively denser layer of gypsum slurry (relative to the gypsum slurry comprising the core), often referred to as a skim coat in the art, and optionally hard edges as is known in the art. The layers 8, 14 of relatively dense gypsum each have a thickness of about 1 to 10% of the total thickness of the gypsum core (total of layers 8, 10 of FIG. 2 or total of layers 8, 10 and 14 of FIG. 3).

Dispensing assembly 110 includes a gypsum slurry mixer 112 in fluid communication with a slurry distributor 20. The gypsum slurry mixer 112 is adapted to agitate water and calcined gypsum to form an aqueous calcined gypsum slurry. Both the water and the calcined gypsum can be supplied to the mixer 112 via one or more inlets as is known in the art. Any suitable mixer can be used with the slurry distributor.

This assembly 110 would employ at least one moving web of cover sheet (see FIG. 5) coated on the production line with a polymer layer positioned to face the subsequently applied gypsum core slurry. As explained below it also provides apparatus to apply a relatively denser layer of gypsum slurry (denser than the gypsum core slurry) between the polymer layer and the gypsum core slurry layer.

The slurry distributor 20 includes a first feed inlet 24 adapted to receive a first flow of aqueous calcined gypsum slurry from the gypsum slurry mixer 112, a second feed inlet 25 adapted to receive a second flow of aqueous calcined gypsum slurry from the gypsum slurry mixer 112, and a distribution outlet 30 in fluid communication with both the first and the second feed inlets 24, 25 and adapted such that the first and second flows of aqueous calcined gypsum slurry discharge from the slurry distributor 20 through the distribution outlet 30.

The slurry distributor 20 includes a feed conduit 22 in fluid communication with a distribution conduit 28. The feed conduit extends generally along a transverse axis 60 and includes the first feed inlet 24, the second feed inlet 25 disposed in spaced relationship to the first feed inlet 24, and a feed outlet 40 in fluid communication with the first feed inlet 24 and the second feed inlet 25. The distribution conduit 28 extends generally along a longitudinal axis 50, which is substantially perpendicular to the longitudinal axis 60, and includes an entry portion 52 and the distribution outlet 30. The entry portion 52 is in fluid communication with the feed outlet 40 of the feed conduit 22 such that the entry portion 52 is adapted to receive both the first and the second flows of aqueous calcined gypsum slurry from the feed outlet 40 of the feed conduit 22. The distribution outlet 30 is in fluid communication with the entry portion 52. The distribution outlet 30 of the distribution conduit 28 extends a predetermined distance along the transverse axis 60. The slurry distributor 20 is shown in more detail by FIG. 7 and described in more detail below.

Referring to FIG. 6, a delivery conduit 114 is disposed between and in fluid communication with the gypsum slurry mixer 112 and the slurry distributor 20. The delivery conduit 114 includes a main delivery trunk 115, a first delivery branch 117 in fluid communication with the first feed inlet 24 of the slurry distributor 20, and a second delivery branch 118 in fluid communication with the second feed inlet 25 of the slurry distributor 20. The main delivery trunk 115 is in fluid communication with both the first and second delivery branches 117, 118. In other embodiments, the first and second delivery branches 117, 118 can be in independent fluid communication with the gypsum slurry mixer 112.

The delivery conduit 114 can be made from any suitable material and can have different shapes. In some embodiments, the delivery conduit can comprise a flexible conduit.

An aqueous foam supply conduit 121 can be in fluid communication with at least one of the gypsum slurry mixer 112 and the delivery conduit 114. An aqueous foam from a source can be added to the constituent materials through the foam supply conduit 121 at any suitable location downstream of the mixer 112 and/or in the mixer 112 itself to form a foamed gypsum slurry that is provided to the slurry distributor 120. In the illustrated embodiment, the foam supply conduit 121 is disposed downstream of the gypsum slurry mixer 112. In the illustrated embodiment, the aqueous foam supply conduit 121 has a manifold-type arrangement for supplying foam to an injection ring or block associated with the delivery conduit 114 as described in U.S. Pat. No. 6,874,930, for example.

In other embodiments, one or more secondary foam supply conduits can be provided in fluid communication with the mixer. In yet other embodiments, the aqueous foam supply conduit(s) can be in fluid communication with the gypsum slurry mixer alone. As will be appreciated by those skilled in the art, the means for introducing aqueous foam into the gypsum slurry in the gypsum slurry mixing and dispensing assembly 110, including its relative location in the assembly, can be varied and/or optimized to provide a uniform dispersion of aqueous foam in the gypsum slurry to produce board that is fit for its intended purpose.

In yet other embodiments, first and second delivery branches can each include a foam supply conduit therein which are respectively adapted to independently introduce aqueous foam into the first and second flows of aqueous calcined gypsum slurry delivered to the slurry distributor. In still other embodiments, a plurality of mixers can be provided to provide independent streams of slurry to the first and second feed inlets of a slurry distributor constructed in accordance with principles of the present disclosure.

When the foamed gypsum slurry sets and is dried, the foam dispersed in the slurry produces air voids therein which act to lower the overall density of the wallboard. The amount of foam and/or amount of air in the foam can be varied to adjust the dry board density such that the resulting wallboard product is within a desired weight range.

Any suitable foaming agent can be used. Preferably, the aqueous foam is produced in a continuous manner in which a stream of the mix of foaming agent and water is directed to a foam generator, and a stream of the resultant aqueous foam leaves the generator and is directed to and mixed with the calcined gypsum slurry. Some examples of suitable foaming agents are described in U.S. Pat. Nos. 5,683,635 and 5,643,510, for example.

One or more flow-modifying elements 123 can be associated with the delivery conduit 114 and adapted to control the first and the second flows of aqueous calcined gypsum slurry from the gypsum slurry mixer 112. The flow-modifying element(s) 123 can be used to control an operating characteristic of the first and second flows of aqueous calcined gypsum slurry. In the illustrated embodiment of FIG. 4, the flow-modifying element(s) 123 is associated with the main delivery trunk 115. Examples of suitable flow-modifying elements include volume restrictors, pressure reducers, constrictor valves, canisters etc., including those described in U.S. Pat. Nos. 6,494,609; 6,874,930; 7,007,914; and 7,296,919, for example.

At least one the webs of cover sheet material having the polymer layer is also treated to apply over the polymer layer a very thin relatively denser layer of gypsum slurry (relative to the gypsum slurry comprising the core), often referred to as a skim coat in the art over the field of the web and at least one denser stream of gypsum slurry at the edges of the web. The very thin relatively denser layer of gypsum slurry is applied directly to the polymer layer.

To that end, the mixer 112 includes a first auxiliary conduit 129 that is adapted to deposit a stream of dense aqueous calcined gypsum slurry that is relatively denser than the first and second flows of aqueous calcined gypsum slurry delivered to the slurry distributor (i.e., a "face skim coat/hard edge stream"). The first auxiliary conduit 129 can deposit the face skim coat and hard edge stream upon a moving web of cover sheet material upstream of a skim coat roller 131 adapted to apply a skim coat layer to the moving web of cover sheet material and to define hard edges at the periphery of the moving web by virtue of the width of the roller 131 being less than the width of the moving web as is known in the art. Hard edges can be formed from the same dense slurry that forms the thin dense layer by directing portions of the dense slurry around the ends of the roller used to apply the dense layer to the web.

The mixer 112 can also include a second auxiliary conduit 133 adapted to deposit a stream of dense aqueous calcined gypsum slurry that is relatively denser than the first and second flows of aqueous calcined gypsum slurry delivered to the slurry distributor (i.e., a "back skim coat stream"). The second auxiliary conduit 133 can deposit the back skim coat stream upon a second moving web of cover sheet material upstream (in the direction of movement of the second web) of a skim coat roller 137 that is adapted to apply a skim coat layer to the second moving web of cover sheet material as is known in the art. At least one of the first moving web of cover sheet material and the second moving web of cover sheet material is coated with the polymer before depositing the stream of dense aqueous calcined gypsum slurry. Thus, the stream of dense aqueous calcined gypsum slurry is directly deposited on at least one polymer layer. Generally the thin layer of dense aqueous calcined gypsum slurry is deposited on both the first moving web of cover sheet material and the second moving web of cover sheet material. However, the polymer may be on one or both of the first moving web of cover sheet material and the second moving web of cover sheet material.

In other embodiments, separate auxiliary conduits can be connected to the mixer to deliver one or more separate edge streams to the moving web of cover sheet material. Other suitable equipment (such as auxiliary mixers) can be provided in the auxiliary conduits to help make the slurry therein denser, such as by mechanically breaking up foam in the slurry and/or by chemically breaking down the foam through use of a suitable de-foaming agent.

FIG. 7 shows a perspective view of the gypsum slurry distributor 20 of FIG. 6. Other suitable slurry distributors are also known in the art. For example, slurry distributors are disclosed in US Patent Application Publication 2012/0170403 to Li et al, US Patent Application Publication 2007/0045892 to Suceh et al, US Patent Application Publication 2013/0098268 to Li et al, U.S. Pat. No. 6,874,930 to Wittbold et al, U.S. Pat. No. 7,296,919 to Petersen et al, and U.S. Pat. No. 5,718,797 to Philips et sl.

FIG. 7 shows the slurry distributor 20 includes the feed conduit 22, which includes the pair of feed inlets 24, 25, the distribution conduit 28, which is in fluid communication with the feed inlets 24, 25 of the feed conduit and which includes a distribution outlet 30, and a profiling system 32, which is adapted to locally vary the size and/or shape of the distribution outlet 30 of the distribution conduit 28.

The feed conduit 22 extends substantially along the transverse axis or cross-machine direction 60, which is substantially perpendicular to a longitudinal axis or machine direction 50. The first feed inlet 24 and the second feed inlet 25 define openings 34, 35.

The feed conduit 22 includes first and second entry segments 36, 37 and an intermediate connector segment 39.

The connector segment 39 defines a feed outlet 40 in fluid communication with the first and second feed inlets 24, 25 and the distribution conduit 28. The feed outlet 40 is adapted to receive a first flow in a first feed direction 90 and a second flow in a second flow direction 91 of aqueous calcined gypsum slurry from the first and second feed inlets 24, 25, respectively, and to direct the first and second flows 90, 91 of aqueous calcined gypsum slurry into the distribution conduit 28. The feed outlet 40 is disposed intermediately between the first feed inlet 24 and the second feed inlet 25.

The distribution conduit 28 extends generally along the longitudinal axis 50 and includes the entry portion 52 and the distribution outlet 30. The entry portion 52 is in fluid communication with the feed outlet 40 of the feed conduit 22, and thus the first and the second feed inlets 24, 25, as well. The entry portion 52 is adapted to receive both the first and the second flows 90, 91 of aqueous calcined gypsum slurry from the feed outlet 40 of the feed conduit 22. The entry portion 52 of the distribution conduit 28 includes a distribution inlet 54 in fluid communication with the feed outlet 40 of the feed conduit 22. The illustrated distribution 54 inlet defines an opening 56 that substantially corresponds to the opening 42 of the feed outlet 40.

The distribution outlet 30 is in fluid communication with the entry portion 52 and thus the feed outlet 40 and both the first and second feed inlets 24, 25. The illustrated distribution outlet 30 defines a generally rectangular opening 62.

The slurry distributor is adapted such that the combined first and second flows 90, 91 of aqueous calcined gypsum slurry move through the entry portion 52 from the distribution inlet 54 generally along a distribution direction 93 toward the distribution outlet opening 62. The illustrated distribution direction 93 is substantially along the longitudinal axis 50.

The profiling system 32 includes a plate 70, a plurality of mounting bolts 72 securing the plate to the distribution conduit 28 adjacent the distribution outlet 30, and a series of adjustment bolts 74, 75 threadingly secured thereto. The mounting bolts 72 are used to secure the plate 70 to the distribution conduit 28 adjacent the distribution outlet 30. The plate 70 extends substantially along the transverse axis 60 over the width of the distribution outlet 30.

The portion of the distribution conduit 28 defining the distribution outlet 30 is made from a resiliently flexible material such that its shape is adapted to be variable along its width in the transverse cross-machine direction 60, such as by the adjustment bolts 74, 75 adjustable to locally vary the size and/or shape of the distribution outlet 30.

Polymer for Coating

The coating composition used in the present invention comprises a polymer as a binder. In particular the polymer is a synthetic latex (i.e., an aqueous dispersion of polymer particles prepared by emulsion polymerization of one or more monomers). The polymer of the polymer coating is disposed on all of the inner surface of the face paper sheet between the face paper sheet and the gypsum core, wherein at least a portion of the polymer coating penetrates from the inner surface of the face paper sheet through a portion of the face paper sheet but not into the gypsum core. The polymer coating comprises an aqueous emulsion or dispersion comprising water, latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof, and surfactant. Preferably the latex binder has an absence of ethylene vinyl acetate and/or hydroxyethyl cellulose.

Preferably the latex polymer is elected from styrene-butadiene latex, styrene acrylic polymer or acrylic ester polymer. Preferably, the binder glass transition temperature is in the range from about −10° C. to about 30° C., and more preferably from about 5 to about 30° C., and more preferably from about 10 to about 20° C.

The polymer coating has an absence of mineral filler. The polymer coating has an absence of gypsum. The polymer coating has an absence of calcium carbonate. The polymer coating has an absence of magnesium carbonate. The polymer coating has an absence of pigment.

Generally the polymer is applied in an amount equal to that to form a polymer coating having a thickness of 30 mils or less. This depth does not include the depth to which the polymer penetrates the paper sheet. Thus, although an amount equal to that for a 30 mil coating is applied all or a substantial portion will be absorbed into the paper so the coating extending out of the paper is substantially less than 30 mils. Thus, the polymer may penetrate a depth of 10 to 20 mils into the paper.

The coating composition is applied on the board manufacturing line by at least one method selected from the group consisting of spray coating, dip coating, rill application, free jet application, blade metering, rod metering, metered film press coating, air knife coating, curtain coating, flexography printing, and roll coating.

Methods for preparing synthetic latexes are well known in the art and any of these procedures can be used. Latexes typically have 1-55 wt % binder (polymer) and water. Some latexes also have fillers.

Final particle size of the latex can vary from 30 nm to 1500 nm.

Dispersant

Dispersants are known for use with gypsum to help fluidize the mixture of water and calcium sulfate hemihydrate so less water is needed to make flowable slurry.

The slurries typically contain a dispersant such as polynaphthalene sulfonate. Polynaphthalene sulfonate dispersants are well known and relatively cheaper, but have limited efficacy. Polynaphthalene sulfonate has good compatibility with starch, foaming agents, and clays. A production process for polynaphthalene sulfonates includes the following reaction steps: sulfonation of naphthalene with sulfuric acid producing b-naphthalene-sulfonic acid, condensation of b-naphthalene sulfonic acid with formaldehyde producing polymethylene naphthalene sulfonic acid, and neutralization of polymethylene naphthalene sulfonic acid with sodium hydroxide or another hydroxide. Depending on reaction conditions products with different characteristics are obtained.

U.S. Pat. No. 4,460,720 to Gaidis et al discloses a superplasticizer cement admixture for Portland based compositions formed from a low molecular weight alkali metal polyacrylate in combination with an alkali metal or alkaline earth metal polynaphthalene sulfonate-formaldehyde or an alkali metal lignosulfonate or an alkaline earth metal lignosulfonate or mixtures thereof.

U.S. Pat. No. 5,718,759 discloses the addition of silicates to mixtures of beta-calcined gypsum and cement. In the examples, lignosulfates or naphthalene sulfonates are used as water-reducing agents. The addition of pozzolanic materials, including silicates, is credited with-reducing expansion due to the formation of ettringite. The composition is suggested for use in building materials, such as backer boards, floor underlayments, road patching materials, fire-stopping materials and fiberboard.

U.S. Pat. No. 7,767,019 to Liu et al discloses embodiments of branched polycarboxylates for use as dispersants.

Enhancing Materials Chosen from Condensed Phosphoric Acids

Preferably the composition also contains enhancing materials chosen from condensed phosphoric acids, each of which comprises 2 or more phosphoric acid units; and salts or ions of condensed phosphates, each of which comprises 2 or more phosphate units. The enhancing materials are preferably chosen from the group consisting of: phosphoric acids, each of which comprises 1 or more phosphoric acid units; salts or ions of condensed phosphates, each of which comprises 2 or more phosphate units; and monobasic salts or monovalent ions of orthophosphates. The enhancing materials will impart increased resistance to permanent deformation to the set gypsum formed. Moreover, some enhancing materials (e.g., the following salts, or the anionic portions thereof: sodium trimetaphosphate (also referred to herein as STMP), sodium hexametaphosphate having 6-27 repeating phosphate units (also referred to herein as SHMP), and ammonium polyphosphate having 1000-3000 repeating phosphate units (also referred to herein as APP) will provide preferred benefits, such as greater increase in sag resistance. Also, APP provides equal sag resistance to that provided by STMP, even when added in only one fourth the STMP concentration.

Typically, this is accomplished by adding trimetaphosphate ion to a mixture of calcined gypsum and water to be used to produce set gypsum-containing products.

Calcined Gypsum

As used herein, the term, "calcined gypsum", is intended to mean alpha calcium sulfate hemihydrate, beta calcium sulfate hemihydrate, water-soluble calcium sulfate anhydrite, or mixtures of any or all thereof, and the terms, "set gypsum" and "hydrated gypsum", are intended to mean calcium sulfate dihydrate. The water in the mixture reacts spontaneously with the calcined gypsum to form set gypsum.

The calcined gypsum employed in the invention can be in the form and concentrations typically found useful in the corresponding embodiments of the prior art. It can be alpha calcium sulfate hemihydrate, beta calcium sulfate hemihydrate, water-soluble calcium sulfate anhydrite, or mixtures of any or all thereof, from natural or synthetic sources. In some preferred embodiments alpha calcium sulfate hemihydrate is employed for its yield of set gypsum having relatively high strength. In other preferred embodiments beta calcium sulfate hemihydrate or a mixture of beta calcium sulfate hemihydrate and water-soluble calcium sulfate anhydrite are employed.

Water

Water is added to the slurry in any amount that makes a flowable slurry. The amount of water to be used varies greatly according to the application with which it is being used, the exact dispersant being used, the properties of the stucco and the additives being used. The water to stucco weight ratio ("WSR") with wallboard is 0.1-1.5:1, preferably 0.2-0.8:1, more preferably 0.4-0.8:1.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Additives

Other conventional additives can be employed in the practice of the invention in customary amounts to impart desirable properties and to facilitate manufacturing, such as, for example, aqueous foam, set accelerators, set retarders, recalcination inhibitors, binders, adhesives, leveling or non-leveling agents, thickeners, bactericides, fungicides, pH adjusters, colorants, reinforcing materials, fire retardants, water repellants, fillers and mixtures thereof.

The gypsum slurry also optionally includes one or more modifiers that enhance the ability of the dispersant to fluidize the slurry, thus improving its efficacy. The two-repeating unit dispersant used here may be particularly susceptible to the effects of the modifiers. Preferred modifiers include cement, lime, also known as quicklime or calcium oxide, slaked lime, also known as calcium hydroxide, soda ash, also known a sodium carbonate, and other carbonates, silicates, phosphonates and phosphates. Dosage of the modifier is from 0.05% to about 1% depending on the modifier being used and the application with which it is used. Additional information on modifiers and their use is found in U.S. Published Patent Application No. US 2006-0280898 A1, entitled "Modifiers for Gypsum Slurries and Method of Using Them", incorporated by reference.

Preferably the modifiers and the dispersant are added to the mixer water prior to the addition of the hemihydrate. If both the modifier and the dispersant are in dry form, they can be pre-blended with each other and added with the stucco. This sequence of addition yields more of a boost in efficacy of the dispersant. A method for adding dispersants and modifiers to a stucco composition is disclosed in more detail in US 2006-0280898 A1, entitled "Modifiers for Gypsum Slurries and Method of Using Them", incorporated by reference. Paragraphs [0022]-[0023] of US 2006-0280898 A1 disclose the following: Reduction in the amount of water used to make the slurry is achieved by the addition of a polycarboxylate dispersant. The dispersant attaches itself to the calcium sulfate, then charged groups on the backbone and the side chains on the branches of the polymer repel each other, causing the gypsum particles to spread out and flow easily. When the slurry flows more easily, the amount of water can be reduced and still obtain a flowable fluid. In general, reduction in water results in increased product strength and lower drying costs.

Additional additives are also added to the slurry as are typical for the particular application to which the gypsum slurry will be put. Set retarders (up to about 2 lb./MSF (9.8 g/m$^2$)) or dry accelerators (up to about 35 lb./MSF (170 g/m$^2$)) are added to modify the rate at which the hydration reactions take place. Calcium Sulfate Accelerator ("CSA") is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

The gypsum slurry may include additives to modify one or more properties of the final product. Additives are used in the manner and amounts as are known in the art. Concentrations are reported in amounts per 1000 square feet of finished board panels ("MSF"). Starches are used in amounts from about 3 to about 20 lbs./MSF (14.6 to 97.6 g/m$^2$) to increase the paper bond and strengthen the product. Glass fibers are optionally added to the slurry in amounts of at least 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistance of the finished gypsum board panel.

To yield voids in the set gypsum-containing product to provide lighter weight, any of the conventional foaming agents known to be useful in preparing foamed set gypsum products can be employed. Many such foaming agents are well known and readily available commercially, e.g., soap. Foams and a preferred method for preparing foamed gypsum products are disclosed in U.S. Pat. No. 5,683,635, herein incorporated by reference. If foam is added to the product, the polycarboxylate dispersant and/or polynaphthalene sulfonate (if employed) is optionally divided between the gauge water and the foam water or two different dispersants are used in the gauge water and the foam water prior to its addition to the calcium sulfate hemihydrate. This method is disclosed in US published patent application 2006-0278128 A1, entitled, "Effective Use of Dispersants in Wallboard Containing Foam", incorporated by reference.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Biocides can be added to either the covering or the gypsum core. When used, biocides are used in the coverings in amounts of less than 500 ppm.

In addition, the gypsum composition optionally can include a starch, such as a pregelatinized starch or an acid modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

Other known additives may be used as needed to modify specific properties of the product. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite. These and other known additives are useful in the present slurry and wallboard formulations.

In a composition and method for producing a gypsum board, the composition comprises a mixture of calcined gypsum (calcium sulfate hemihydrate), water, linear polycarboxylate dispersant, trimetaphosphate ion, and a pregelatinized starch.

Foaming Agent

In embodiments of the invention that employ a foaming agent to yield voids in the set gypsum-containing product to provide lighter weight, any of the conventional foaming agents known to be useful in preparing foamed set gypsum products can be employed. A preferred range of foaming agent is from about 0.2 lb/MSF to about 1.5 lb/MSF. Many such foaming agents are well known and readily available commercially, e.g., soap. For further descriptions of useful foaming agents, see, for example: U.S. Pat. Nos. 4,676,835; 5,158,612; 5,240,639 and 5,643,510; and PCT International Application Publication WO 95116515, published Jun. 22, 1995.

In many cases it will be preferred to form relatively large voids in the gypsum product, to help maintain its strength. This can be accomplished by employing a foaming agent that generates foam that is relatively unstable when in contact with calcined gypsum slurry. Preferably, this is accomplished by blending a major amount of foaming agent known to generate relatively unstable foam, with a minor amount of foaming agent known to generate relatively stable foam.

Such a foaming agent mixture can be pre-blended "off-line", i.e., separate from the process of preparing foamed gypsum product. However, it is preferable to blend such foaming agents concurrently and continuously, as an integral "on-line" part of the process. This can be accomplished, for example, by pumping separate streams of the different foaming agents and bringing the streams together at, or just prior to, the foam generator that is employed to generate the stream of aqueous foam which is then inserted into and mixed with the calcined gypsum slurry. By blending in this manner, the ratio of foaming agents in the blend can be simply and efficiently adjusted (for example, by changing the flow rate of one or both of the separate streams) to achieve the desired void characteristics in the foamed set gypsum product. Such adjustment will be made in response to an examination of the final product to determine whether such adjustment is needed. Further description of such "on-line" blending and adjusting can be found in U.S. Pat. No. 5,643,510, and in U.S. Pat. No. 5,683,635.

An example of one type of foaming agent, useful to generate unstable foams, has the formula $ROSO_3^-M^+$, wherein R is an alkyl group containing from 2 to 20 carbon atoms, and M is a cation. Preferably, R is an alkyl group containing from 8 to 12 carbon atoms. An example of one type of foaming agent, useful to generate stable foams, has the formula $CH_3(CH_2)_xCH_2(OCH_2CH_2)yOSO_3^-M^+$, wherein X is a number from 2 to 20, Y is a number from 0 to 10 and is greater than 0 in at least 50 weight percent of the foaming agent, and M is a cation. Blends of these foaming agents may also be employed.

In some preferred embodiments of the invention, the aqueous foam has been generated from a pre-blended foaming agent having the formula $CH_3(CH_2)_xCH_2(OCH_2CH_2)yOSO_3^-M^+$, wherein X is a number from 2 to 20, Y is a number from 0 to 10 and is 0 in at least 50 weight percent of the foaming agent, and M is a cation. Preferably, Y is 0 in from 86 to 99 weight percent of this foaming agent.

The following examples are presented to further illustrate some preferred embodiments of the invention and to compare them with methods and compositions outside the scope of the invention. Unless otherwise indicated, concentrations of materials in compositions and mixtures are given in percent by weight based upon the weight of calcined gypsum present.

Example 1

This study explores the feasibility of coating the face paper of a drywall with a thin layer of polymer emulsion to improve nailpull. The polymers are used as admixtures for cement-based products or as binders for coatings and primers over different substrates to improve strength, adhesion and water resistance are used in formulating interior or exterior paint for improved durability and water resistance. All of these polymers of the invention have a glass-transition temperature below 30° C. Comparative polymer Emulsion D included a polymer having a glass-transition temperature above 30° C.

The tested compositions are listed in TABLE 1. They are latexes.

TABLE 1

| POLYMER NAME | Minimum Film Forming Temperature (MFFT) (° C.) | Glass Transition Temperature (° C.) |
|---|---|---|
| Acrylic co-polymer dispersion A | — | 11 |
| Vinyl-acrylic copolymer emulsion B | — | 19 |
| Acrylic emulsion C | 20 | 10 |
| Styrenated acrylic emulsion D (comparative example) | 44 | 40 |
| Vinyl acetate/ethylene emulsion E | 0 | 13 |
| Emulsion of organic acrylic polymer with inorganic silica F (45% solids) | — | 12 |

As a fast method of screening different polymer emulsions, the polymers were used to coat the face of ½" gypsum drywall board. The board was cut into 6"×6" pieces and using each polymer six pieces were coated using a paint roller. The amount of applied polymer coat on wet (water inclusive) bases was determined by measuring the initial weight of the board sample and the weight right after coating and in all cases the amount of polymer was found to be 10-12 lb/MSF. The board samples were allowed to dry at room temperature overnight. All tested polymers cure by self-crosslinking to form a transparent hard film. Four nail-pull data points were obtained for each sample.

Figure 8:
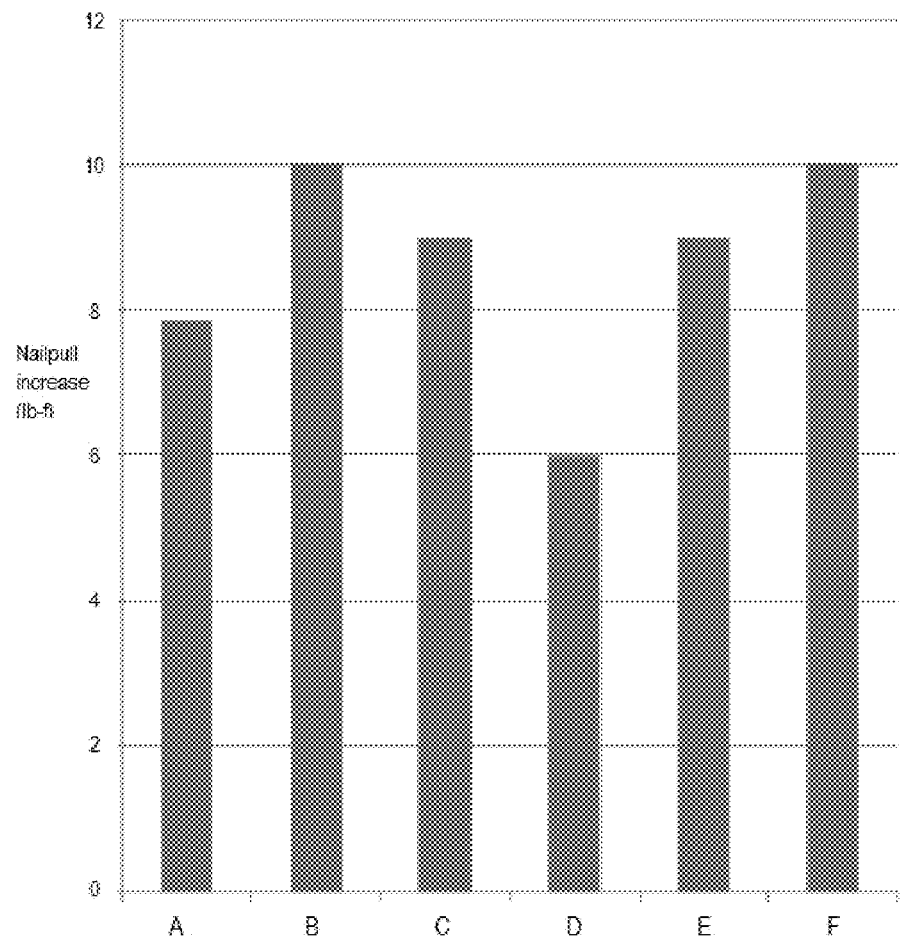
FIG. 8 shows for Example 1 Nailpull gain due to coating the board face with different polymers, wherein 10-12 lb/MSF (pounds per thousand square feet) coat was applied using paint roller, wherein ½ drywall gypsum board was used as a control, and wherein the Nailpull for the control board was 79 lbf.
Figure 9:
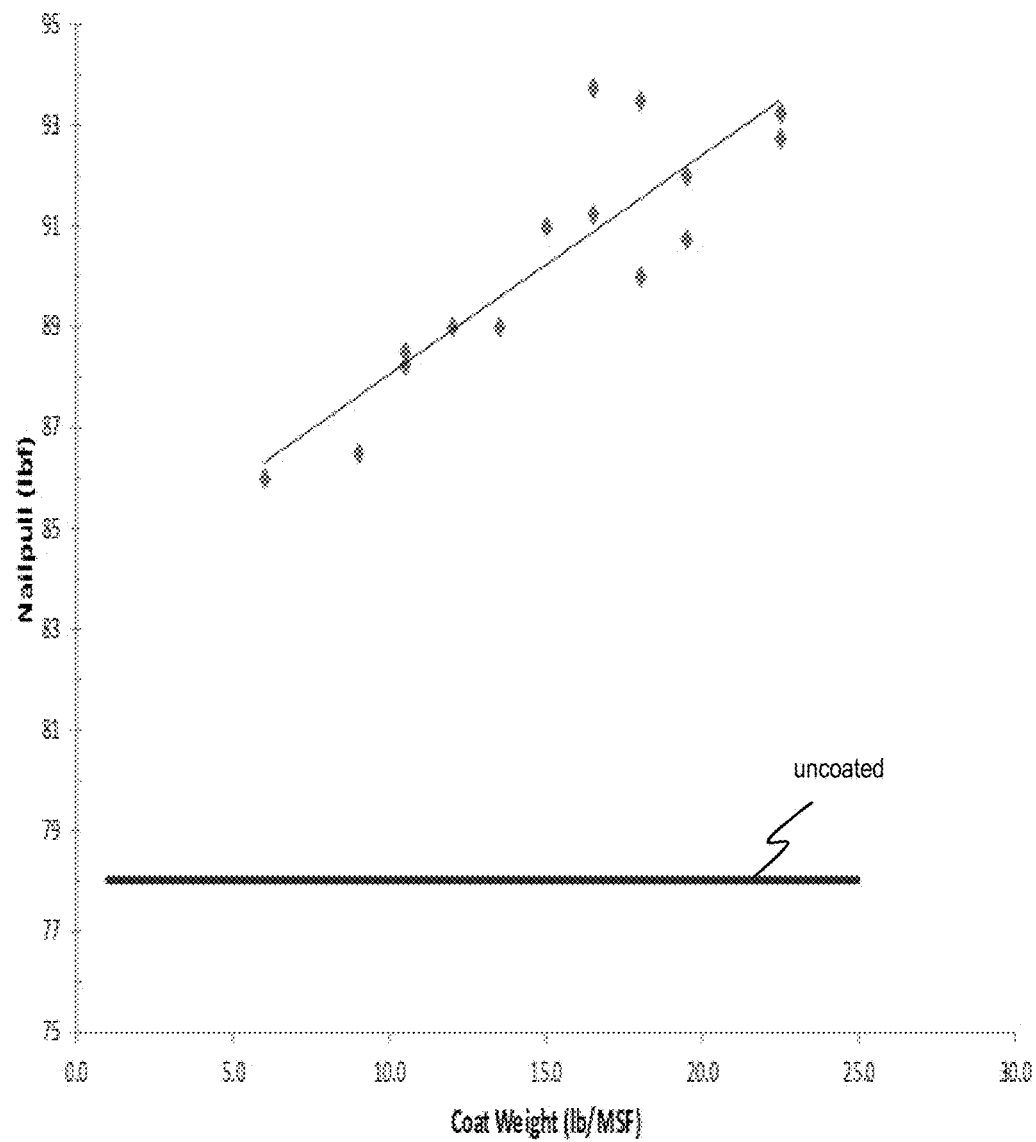
FIG. 9: Effect of coat weight on Nailpull data of Example 2, wherein the polymer was sprayed using high pressure spray gun.

FIG. 8 shows for Example 1 Nailpull gain due to coating the board face with different polymers of TABLE 1. 10-12 lb/MSF coat was applied using paint roller wherein ½ SRUL board was used as a control and wherein the Nailpull for the control board was 79 lbf. In particular FIG. 9 shows the nailpull improvement due to coating compared to the control (uncoated board) that has a nailpull of 79±3. The results show all of the tested polymers improved nailpull. However, the Comparative polymer emulsion D was not as effective as emulsions of polymers within the present invention.

Example 2

Vinyl-acrylic copolymer emulsion B was chosen for further investigation. To study the effect of the amount of applied coating, different board samples were sprayed with high-pressure spray gun using Vinyl-acrylic copolymer emulsion B. The results of nailpull vs. the weight of applied coat are shown in FIG. 9. The results show that nailpull linearly increases with the amount of applied coat within the studied range and about 12 lb/MSF of polymer is required to increase the nailpull by 10 lbf. Nailpull (also known as Nail Pull Resistance) was tested according to ASTM C473-15 Method B.

The polymer was sprayed using high pressure spray gun. The thickness of the polymer coat was found to be about 0.004" when cured. It should be mentioned that the solid content in Vinyl-acrylic copolymer emulsion B is about 55% which means the weight of the board after the polymer is dried increases by about 7 pounds when polymer is cured and dried. This improvement in nail pull is promising.

Example 3

Lab gypsum boards made were made and tested for nail pull. Nailpull (also known as Nail Pull Resistance) was tested according to ASTM C473-15 Method B.

Figure 10:
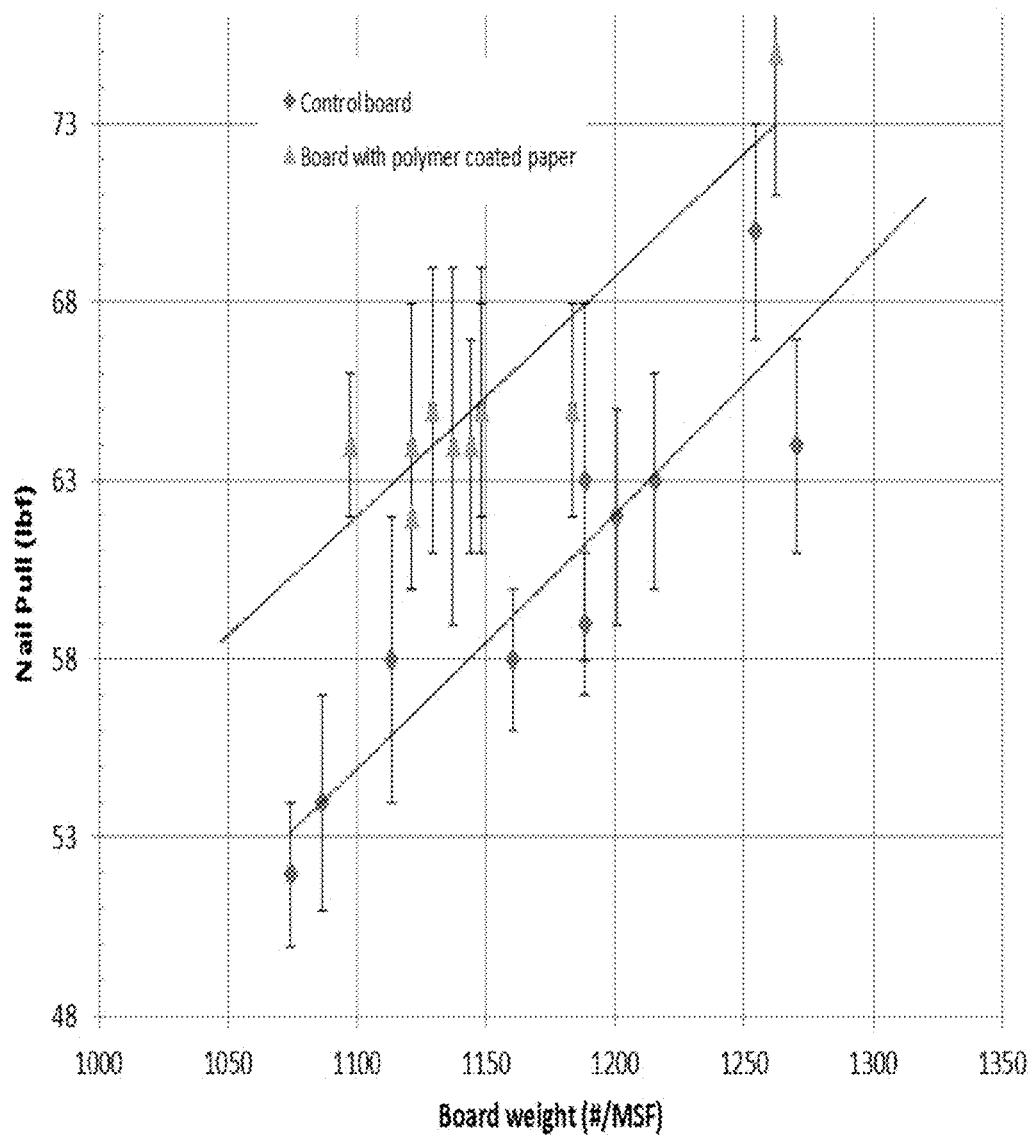
FIG. 10 shows the effect of polymer coating on Nailpull at different lab board weights, wherein the coating weight is about 10-20 lb/MSF, wherein each data point is the average of 8 Nailpull reading obtained from a 9"×9" lab board of Example 3.

The core-side of the face paper was coated few seconds before pouring the slurry into the mold. The coating weight is about 10-20 lb/MSF wherein each data point is the average of 8 nailpull readings obtained from a 9"×9" lab board. FIG. 10 shows the effect of Vinyl-acrylic copolymer emulsion B coating on nailpull at different lab gypsum board weights for control boards and boards with polymer coated paper. The amount of polymer emulsion used ranged from 15-20 lb/MSF. The solid (polymer) content of the polymer emulsion was about 25-55 wt % of the polymer emulsion.

FIG. 10 shows when the coat was applied on the core-side of the face paper the coating improved nailpull by 6-7 lbf at all board weights. In contrast, FIG. 9 showed coating the top-side of the paper with this amount of polymer increases the nailpull by 10-14 lbf.

Example 4

The polymers tested had a glass-transition temperature below 30° C. In particular Vinyl-acrylic copolymer emulsion B had a glass-transition temperature of 19° C. The solid content in Vinyl-acrylic copolymer emulsion B was about 55% which means the weight of the board after the polymer is dried increases by about 7 pounds when polymer is cured and dried.

A test was performed using a board (foamed gypsum layer made from foamed gypsum core slurry) with the back paper peeled-off. A relatively dense gypsum slurry (as compared to the density of the gypsum core slurry) was made with the ½" gypsum drywall formulation but using 1.47 water to stucco weight ratio ("WSR") and no foam to give a dry density of 45 pounds per cubic feet.

The foamed gypsum core layer resulting from the set foamed gypsum slurry had a density of 15 to 55 pounds/cubic foot and a total void volume in the range of 30 to 90 volume percent. The preferable air in the set layer of relatively dense gypsum resulting from setting the relatively dense gypsum slurry is as low as possible. No measurement of total void volume was taken for these examples. However, at the temperature/pressure of the examples the maximum air content (total void volume) of the set layer of relatively dense gypsum would have been about 15-20 volume percent.

Figure 11:
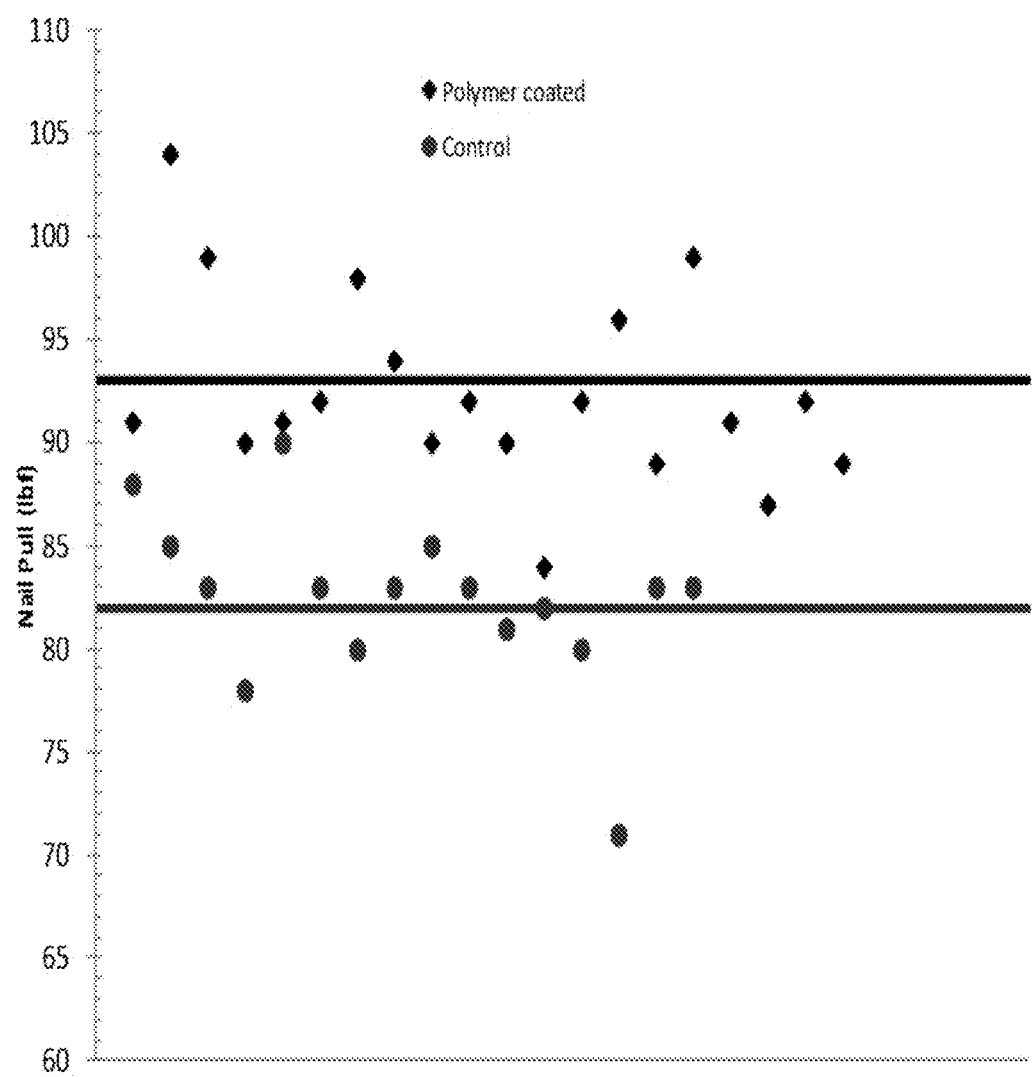
FIG. 11 shows Nailpull results for lab boards of Example 4 made during the production of ½" drywall gypsum, wherein the polymer coat was applied on the bond side of the face paper using paint roller right before the slurry was poured into the mold.

A 0.025" thick template was placed on the exposed surface of the board. Then the dense gypsum slurry was poured into the template and the excess amount of dense gypsum slurry was removed. The paper having the bond side coated with polymer was then laid on the dense gypsum layer and a weight was placed on top of it for about 10 minutes until the slurry is completely set. This experiment was done for uncoated paper (control) and coated paper (bond-side 10 lb/MSF coating). As shown in FIG. 11 the nailpull value for the control boards was 82 lbf. The results for the boards with coated paper showed an average nailpull value of 93 lbf. This showed the large surface area of foamed core was responsible for the lower than expected nailpull values. Thus, if the thin dense gypsum layer is employed then the same approximately 10 lbf Nailpull improvement occurs when the polymer is coated onto the bond side of the paper as was achieved when the polymer was coated on the outside of the paper.

FIG. 11 shows the effect of coating the bond-side of face paper with Vinyl-acrylic copolymer emulsion B on nailpull with a lab-made relatively dense gypsum layer. These results show it is possible to coat the bond-side of the face paper during the board manufacturing process but there should be an unfoamed layer on top of it to get the maximum nailpull improvement.

The results in FIG. 11 show the control sample gypsum panel had a nailpull of 82 and a panel having paper coated with 10 lb/MSF of acrylic polymer panel had a nailpull of 93.

In contrast, TABLE 2 shows the Nailpull values from using 50 wt % polymer at higher dosages in the relatively denser gypsum slurry layer were significantly lower.

TABLE 2

| Relatively Denser Gypsum Slurry Dry (water free) weight lb/MSF | polymer (lb/MSF) | Nail-pull 1 | Nail-pull 2 | Nail-pull 3 | Nail-pull 4 | Average Nailpull |
|---|---|---|---|---|---|---|
| 81 | 38.07 | 82 | 90 | 96 | 87 | 89 |
| 75 | 35.25 | 85 | 79 | 92 | 85 | 85 |
| 68 | 31.96 | 79 | 88 | 82 | 84 | 83 |

Moreover, it was found using 20 wt % of polymer in the core (that is about 250 lb/MSF of the polymer emulsion) did not improve the Nailpull strength. The solid (polymer) content of the emulsion was about 25 to 55 wt % of the polymer emulsion.

Thus, the data shows coating the paper is more efficient than adding the polymer in the relatively denser slurry layer.

The invention is not limited by the above provided embodiments but rather is defined by the claims appended hereto.

What is claimed is:

1. A method of making a gypsum board, comprising:
providing a face paper sheet having an inner bond surface and an outer surface and a face paper sheet thickness, the face paper sheet inner bond surface opposed to the face paper sheet outer surface;
applying a polymer coating to the inner bond surface of the face paper sheet, wherein the polymer coating comprises water and latex polymer selected from the group consisting of acrylics, styrene acrylics, acrylic esters, vinyl acrylics, vinyl chloride acrylic, styrene acetate acrylics, ethylene polyvinyl acetate, polyvinyl acetate, styrene butadiene, and combinations thereof and surfactant, the latex polymer having a glass transition temperature (Tg) of 10° C. to 20° C.;
depositing a first layer of relatively dense gypsum slurry comprising water and calcium sulfate hemihydrate directly on the polymer coated inner bond surface of the face paper sheet to form a first layer of relatively dense slurry, wherein all of the surface of the face paper sheet which contacts the relatively dense gypsum slurry is coated with the polymer;
mixing water, calcium sulfate hemihydrate, and air to make a foamed gypsum slurry, wherein a weight ratio of the water to calcium sulfate hemihydrate being mixed is 0.2-1.5:1;
depositing the foamed gypsum slurry directly on the first layer of relatively dense gypsum slurry to form a foamed gypsum core layer to locate the first layer of relatively dense gypsum layer between the gypsum core layer and the face paper sheet inner bond surface;
wherein calcium sulfate hemihydrate in the foamed gypsum slurry and calcium sulfate hemihydrate in the relatively dense gypsum slurry convert to calcium sulfate dihydrate, and the foamed gypsum slurry and the relatively dense gypsum slurry set to form the gypsum board,
wherein a foamed gypsum core layer resulting from the set foamed gypsum slurry has a thickness of 0.25 to 1 inches and a density of 15 to 55 pounds/cubic foot, wherein the foamed gypsum core layer resulting from the set foamed gypsum slurry has a total void volume of 30 to 90 volume percent;

the relatively dense gypsum slurry having a density greater than that of the foamed gypsum slurry, the first layer of relatively dense gypsum slurry being thinner than the foamed gypsum core layer, wherein the set first layer of relatively dense gypsum resulting from setting the relatively dense gypsum slurry has a total void volume of less than 30 volume percent;

wherein the polymer coating is at least partially not set at the time the first layer of relatively dense slurry is applied to the polymer coating;

wherein the polymer coating contacts the face paper sheet and the set first layer of relatively dense gypsum;

wherein at least a portion of the polymer coating penetrates from the inner bond surface of the face paper sheet through a portion of the face paper sheet, such that the latex polymer migrates through at least 20% of the face paper sheet thickness, but wherein the polymer coating does not uniformly penetrate into the first layer of relatively dense slurry, such that at least 90% of a thickness of the set first relatively dense gypsum layer has an absence of latex polymer;

wherein the polymer coating applied has an absence of gypsum, wherein the polymer coating applied has an absence of calcium carbonate, wherein the polymer coating applied has an absence of magnesium carbonate, wherein the polymer coating applied has an absence of pigment, wherein the polymer coating applied has an absence of polyurea, and wherein the polymer coating applied has an absence of inorganic particles.

2. The method of claim 1, wherein the nailpull of the gypsum board according to ASTM C473-15 Method B is greater than 80 pounds.

3. The method of claim 2,
wherein the set first layer of relatively dense gypsum has total void volume of 15-20 volume %,
wherein the relatively dense gypsum slurry has 0.5 to 10% by weight pregelatinized starch,
wherein the latex binder has an absence of hydroxyethyl cellulose and an absence of ethylene polyvinyl acetate.

4. The method of claim 1, wherein the polymer coating is applied to the inner side of the face paper sheet by a member of the group consisting of curtain coaters, sprayers, drip lines, and atomization apparatus.

5. The method of claim 1, wherein the polymer coating is applied by spraying the inner side of the face paper sheet, wherein the relatively dense slurry is deposited on the coated side of the face paper sheet to form a layer of relatively dense slurry directly on the polymer coating;
wherein the foamed slurry is deposited directly on the layer of relatively dense slurry to form the foamed gypsum core material.

6. The method of claim 1, wherein the gypsum core material has a total void volume of 35 to 85 volume percent.

7. The method of claim 1, wherein the gypsum core material has a total void volume of 45 to 80 volume percent and the set first layer of relatively dense gypsum resulting from setting the relatively dense gypsum slurry has a total void volume of less than 10 volume %.

8. The method of claim 1, wherein the gypsum board comprises the gypsum core sandwiched between the face paper sheet and a back paper sheet.

9. The method of claim 1, wherein the polymer coating is disposed on the entire inner surface of the face paper sheet to be between the face paper sheet and the gypsum core, wherein at least a portion of the polymer coating penetrates from the inner surface of the face paper sheet through a portion of the face paper sheet but not into the gypsum core.

10. The method of claim 1, wherein the polymer coating is also disposed on the entire outer surface of the face paper sheet facing away from the gypsum core, wherein at least a portion of the polymer coating penetrates from the outer surface of the face paper sheet through a portion of the face paper sheet but not into the gypsum core.

11. The method of claim 1, wherein the relatively dense gypsum slurry being deposited consists of the calcium sulfate hemihydrate, the water, dispersant, an enhancing material selected from the group consisting of phosphoric acids, each of which comprises one or more phosphoric acid units; salts or ions of condensed phosphates, each of which comprises two or more phosphate units; monobasic salts or monovalent ions of orthophosphates; and any combination thereof, and optionally one or more members of the group consisting of set accelerators, set retarders, recalcination inhibitors, bactericides, fungicides, biocides, pH adjusters, colorants, cement, lime, paper fibers, starches, and, sugars, wax, polysiloxanes, boric acid, vermiculite, and fly ash.

12. The method of claim 1, wherein the weight ratio of the water to calcium sulfate hemihydrate being mixed is 0.2-0.4:1.

13. The method of claim 1, wherein the thickness of the relatively dense gypsum layer is about 1 to about 10% of the thickness of the foamed gypsum core layer resulting from the set foamed gypsum slurry, wherein the latex polymer migrates through at least 10 mils to 20 mils of the face paper sheet thickness, wherein the latex polymer a particle size in the range of 500 nm to 1500 nm.

14. The method of claim 1, wherein the latex binder has an absence of hydroxyethyl cellulose.

15. The method of claim 1, wherein the foamed gypsum slurry and the relatively dense gypsum slurry comprise starch.

16. The method of claim 1, wherein the set first layer of relatively dense gypsum has total void volume of 15-20 volume %.

17. The method of claim 1, wherein the latex binder has an absence of ethylene polyvinyl acetate.

* * * * *